US012625728B2

(12) United States Patent
Kumar et al.

(10) Patent No.: US 12,625,728 B2
(45) Date of Patent: May 12, 2026

(54) MULTIPLE GRANULARITY DATA FLOW ANALYSIS IN MAINFRAME APPLICATIONS

(71) Applicant: International Business Machines Corporation, Armonk, NY (US)

(72) Inventors: Atul Kumar, Bangalore (IN); Vitobha Munigala, Secunderabad (IN); Alex Mathai, Mumbai (IN); Amith Singhee, Bangalore (IN); Rahamim Katan, Modiin (IL); Keerthi Narayan Raghunath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 18/485,864

(22) Filed: Oct. 12, 2023

(65) Prior Publication Data

US 2025/0123888 A1 Apr. 17, 2025

(51) Int. Cl.
*G06F 9/50* (2006.01)

(52) U.S. Cl.
CPC ..................................... *G06F 9/50* (2013.01)

(58) Field of Classification Search
CPC .................................. G06F 9/50; G06F 8/433
USPC ......................................................... 718/104
See application file for complete search history.

(56) References Cited

U.S. PATENT DOCUMENTS

| | | | |
|---|---|---|---|
| 7,392,514 B2 | 6/2008 | Edwards | |
| 7,792,853 B2 | 9/2010 | Subbian et al. | |
| 9,563,411 B2 | 2/2017 | Roberts | |
| 10,649,885 B2 | 5/2020 | Rakshit et al. | |
| 11,086,751 B2 | 8/2021 | Moresmau et al. | |
| 2004/0064544 A1* | 4/2004 | Barsness | G06F 11/3466 709/224 |
| 2007/0106695 A1* | 5/2007 | Miyazawa | G06F 8/70 |
| 2010/0325359 A1 | 12/2010 | Goel et al. | |
| 2012/0060165 A1* | 3/2012 | Clarke | G06F 11/3006 709/224 |
| 2012/0179726 A1* | 7/2012 | Roberts | G06F 11/3604 707/E17.011 |

(Continued)

OTHER PUBLICATIONS

Glass, Two Mistakes and Error-Free Software: A Confession, IEEE Software, 2008, pp. 95-96, IEEE, accessed Oct. 6, 2023, https://ifs.host.cs.st-andrews.ac.uk/Books/SE9/Web/Testing/PathTest.html.

(Continued)

*Primary Examiner* — Adam Lee
(74) *Attorney, Agent, or Firm* — Yee & Associates, P.C.

(57) ABSTRACT

Data flow analysis is provided. A program level data flow analysis is performed for each respective data flow path in a set of control flow chains corresponding to each respective program called by a particular job step in each respective job of a plurality of jobs in a sequence of job execution corresponding to an application. A particular field of a plurality of fields is identified in a record of each dataset of a plurality of datasets corresponding to the application that is included in a particular data flow path to form a field level data flow analysis for each particular data flow path. Results of the field level data flow analysis for each particular data flow path in the set of control flow chains corresponding to each respective program called by the particular job step in each respective job of the plurality of jobs is aggregated.

16 Claims, 13 Drawing Sheets

(56) References Cited

U.S. PATENT DOCUMENTS

| | | | | |
|---|---|---|---|---|
| 2016/0071194 | A1* | 3/2016 | Proulx | G06Q 30/0633 |
| | | | | 705/26.8 |
| 2016/0371288 | A1* | 12/2016 | Le Biannic | G06F 16/24578 |
| 2017/0126627 | A1* | 5/2017 | Yang | H04L 63/20 |
| 2017/0351744 | A1* | 12/2017 | Refael | G06F 9/455 |
| 2018/0129699 | A1* | 5/2018 | Gould | G06F 16/288 |
| 2019/0158420 | A1 | 5/2019 | Soni et al. | |
| 2020/0210194 | A1* | 7/2020 | Li | G06F 8/443 |
| 2021/0295822 | A1* | 9/2021 | Tomkins | G10L 15/197 |
| 2022/0188659 | A1* | 6/2022 | Krasnoslobodtsev | G06N 3/08 |
| 2023/0128085 | A1* | 4/2023 | Yan | G06F 12/0802 |
| | | | | 707/737 |
| 2023/0176861 | A1* | 6/2023 | Yasue | G06F 8/75 |
| | | | | 717/123 |
| 2024/0192932 | A1* | 6/2024 | Iyappan Velammal | G06F 8/40 |
| 2025/0013508 | A1* | 1/2025 | Hamed | G06F 9/54 |

OTHER PUBLICATIONS

Kebbal, "Automatic flow analysis using symbolic execution and path enumeration," Proceedings of the 2006 International Conference on Parallel Processing Workshops (ICPPW'06), 2006, 8 pages, IEEE Computer Society, accessed Oct. 6, 2023, https://www.irit.fr/publis/TRACES/6678_IWEC.pdf.

Krishnan et al., "Incremental Analysis of Legacy Applications Using Knowledge Graphs for Application Modernization," CODS-COMAD 2022, Jan. 8-10, 2022, pp. 250-254,ACM Digital Library, Bangalore, India, accessed Oct. 9, 2023, https://doi.org/10.1145/3493700.3493735.

Manta, "Knowing Your COBOL Flows: How MANTA Can Support a Cost-Effective COBOL Migration," 2 pages, getmanta.com, accessed Oct. 6, 2023, https://manta.io/hubfs/How-MANTA-Can-Support-a-Cost-Effective-COBOL-Migration.pdf.

MANTA, "MANTA Flow Installation and Usage Manual," MANTA, accessed Oct. 6, 2023, https://www.ibm.com/support/pages/system/files/inline-files/MANTA%20Flow%20Installation%20and%20Usage%20Manual.pdf.

Norlen, "Architecture for a Symbolic Execution Environment," Department of Computer Science, Electrical and Space Engineering, 2022, Lulea University of Technology, Norrbotten County, Sweden, accessed Oct. 6, 2023, https://ltu.diva-portal.org/smash/get/diva2:1688170/FULLTEXT01.pdf.

Saeidi, et al., "A Generic Framework for Model-Driven Analysis of Heterogeneous Legacy Software Systems," Department of Information and Computing Sciences, Mar. 2017, 20 pages, Utrecht University, Utrecht, The Netherlands, accessed Oct. 6, 2023, https://researchportal.hw.ac.uk/en/publications/a-generic-framework-for-model-driven-analysis-of-heterogeneous-le.

* cited by examiner

COMPUTING ENVIRONMENT
100

DATA FLOW PATHS IN A PROGRAM
IDENTIFICATION PROCESS

CONTROL FLOW CHAINS AND DATA FLOW
PATHS IN A JOB IDENTIFICATION PROCESS

600

602 JOB

608 JOB STEP 1
604 DATASET D1
606 DATASET D2
632 PROGRAM P1

622 JOB STEP 2
618 DATASET D3
620 DATASET D4
634 PROGRAM P2

644 IF CONDITION

JOB STEP 3
624 DATASET D5
626 PROGRAM P3
636

JOB STEP 4
630 DATASET D6
628 PROGRAM P4
638

JOB STEP 5
640 PROGRAM P5
612

JOB STEP 6
610 DATASET D7
614 DATASET D8
616 PROGRAM P6
642

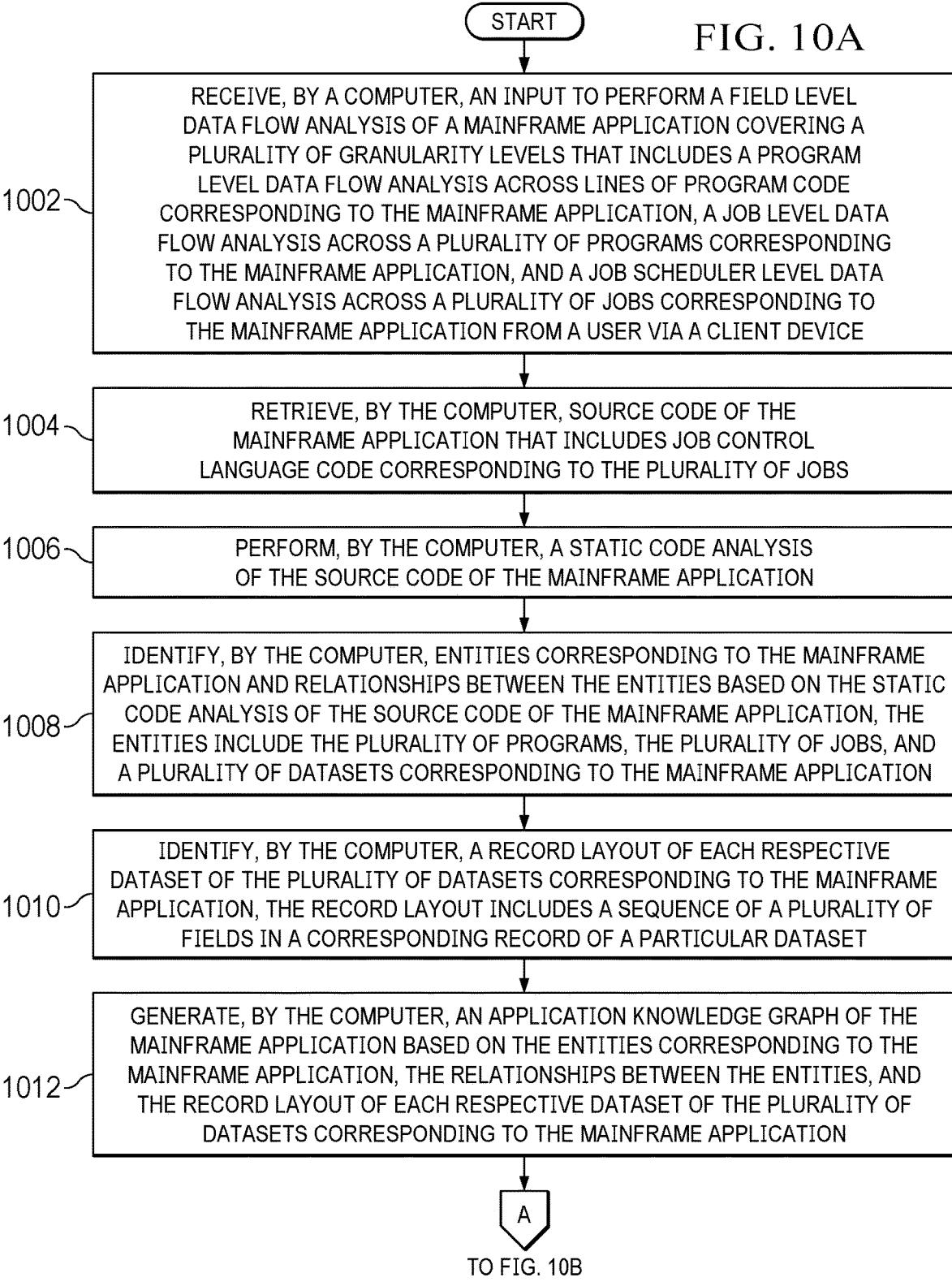

START

FIG. 10A

1002 — RECEIVE, BY A COMPUTER, AN INPUT TO PERFORM A FIELD LEVEL DATA FLOW ANALYSIS OF A MAINFRAME APPLICATION COVERING A PLURALITY OF GRANULARITY LEVELS THAT INCLUDES A PROGRAM LEVEL DATA FLOW ANALYSIS ACROSS LINES OF PROGRAM CODE CORRESPONDING TO THE MAINFRAME APPLICATION, A JOB LEVEL DATA FLOW ANALYSIS ACROSS A PLURALITY OF PROGRAMS CORRESPONDING TO THE MAINFRAME APPLICATION, AND A JOB SCHEDULER LEVEL DATA FLOW ANALYSIS ACROSS A PLURALITY OF JOBS CORRESPONDING TO THE MAINFRAME APPLICATION FROM A USER VIA A CLIENT DEVICE

1004 — RETRIEVE, BY THE COMPUTER, SOURCE CODE OF THE MAINFRAME APPLICATION THAT INCLUDES JOB CONTROL LANGUAGE CODE CORRESPONDING TO THE PLURALITY OF JOBS

1006 — PERFORM, BY THE COMPUTER, A STATIC CODE ANALYSIS OF THE SOURCE CODE OF THE MAINFRAME APPLICATION

1008 — IDENTIFY, BY THE COMPUTER, ENTITIES CORRESPONDING TO THE MAINFRAME APPLICATION AND RELATIONSHIPS BETWEEN THE ENTITIES BASED ON THE STATIC CODE ANALYSIS OF THE SOURCE CODE OF THE MAINFRAME APPLICATION, THE ENTITIES INCLUDE THE PLURALITY OF PROGRAMS, THE PLURALITY OF JOBS, AND A PLURALITY OF DATASETS CORRESPONDING TO THE MAINFRAME APPLICATION

1010 — IDENTIFY, BY THE COMPUTER, A RECORD LAYOUT OF EACH RESPECTIVE DATASET OF THE PLURALITY OF DATASETS CORRESPONDING TO THE MAINFRAME APPLICATION, THE RECORD LAYOUT INCLUDES A SEQUENCE OF A PLURALITY OF FIELDS IN A CORRESPONDING RECORD OF A PARTICULAR DATASET

1012 — GENERATE, BY THE COMPUTER, AN APPLICATION KNOWLEDGE GRAPH OF THE MAINFRAME APPLICATION BASED ON THE ENTITIES CORRESPONDING TO THE MAINFRAME APPLICATION, THE RELATIONSHIPS BETWEEN THE ENTITIES, AND THE RECORD LAYOUT OF EACH RESPECTIVE DATASET OF THE PLURALITY OF DATASETS CORRESPONDING TO THE MAINFRAME APPLICATION

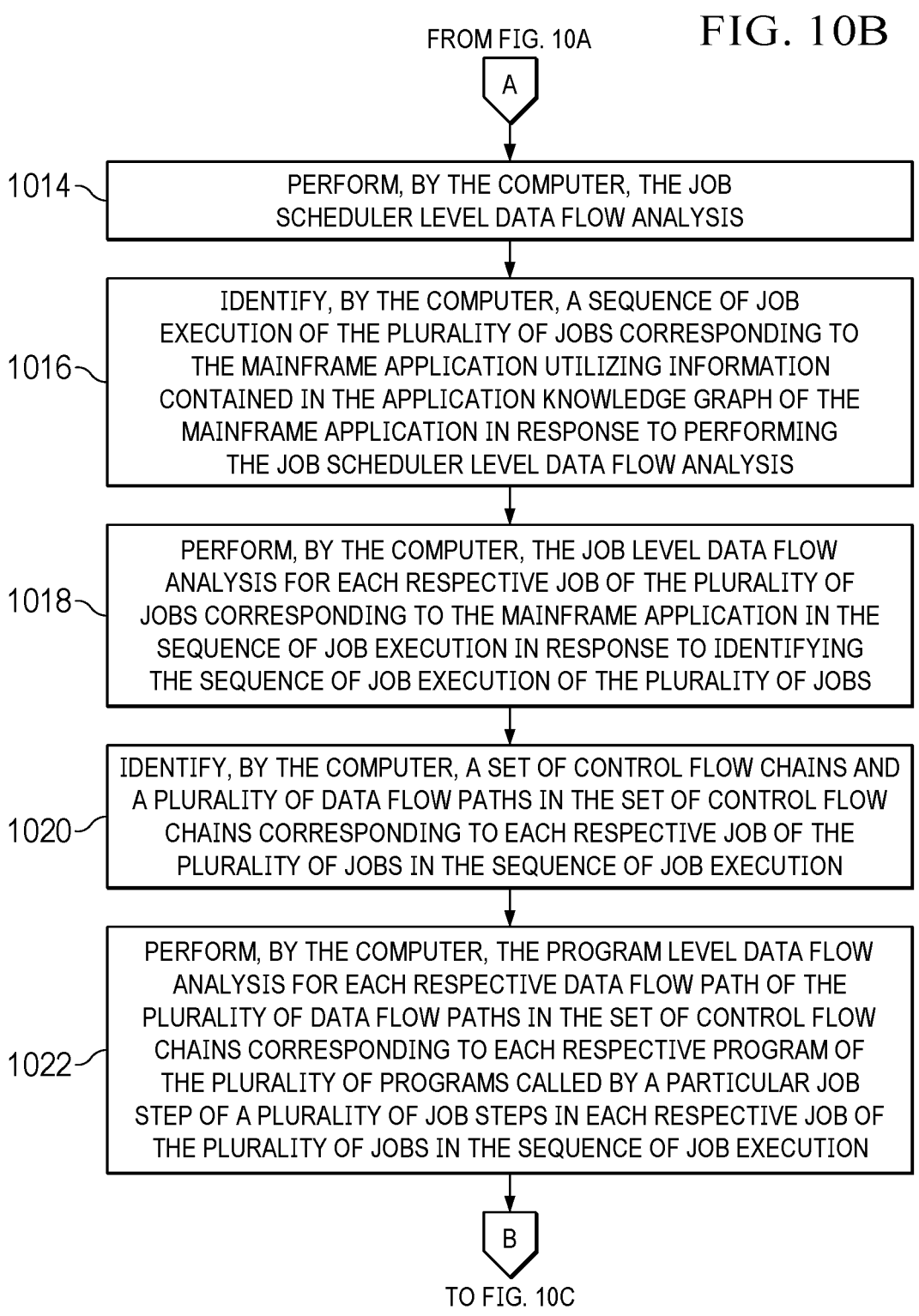

FROM FIG. 10A

A

1014 — PERFORM, BY THE COMPUTER, THE JOB SCHEDULER LEVEL DATA FLOW ANALYSIS

1016 — IDENTIFY, BY THE COMPUTER, A SEQUENCE OF JOB EXECUTION OF THE PLURALITY OF JOBS CORRESPONDING TO THE MAINFRAME APPLICATION UTILIZING INFORMATION CONTAINED IN THE APPLICATION KNOWLEDGE GRAPH OF THE MAINFRAME APPLICATION IN RESPONSE TO PERFORMING THE JOB SCHEDULER LEVEL DATA FLOW ANALYSIS

1018 — PERFORM, BY THE COMPUTER, THE JOB LEVEL DATA FLOW ANALYSIS FOR EACH RESPECTIVE JOB OF THE PLURALITY OF JOBS CORRESPONDING TO THE MAINFRAME APPLICATION IN THE SEQUENCE OF JOB EXECUTION IN RESPONSE TO IDENTIFYING THE SEQUENCE OF JOB EXECUTION OF THE PLURALITY OF JOBS

1020 — IDENTIFY, BY THE COMPUTER, A SET OF CONTROL FLOW CHAINS AND A PLURALITY OF DATA FLOW PATHS IN THE SET OF CONTROL FLOW CHAINS CORRESPONDING TO EACH RESPECTIVE JOB OF THE PLURALITY OF JOBS IN THE SEQUENCE OF JOB EXECUTION

1022 — PERFORM, BY THE COMPUTER, THE PROGRAM LEVEL DATA FLOW ANALYSIS FOR EACH RESPECTIVE DATA FLOW PATH OF THE PLURALITY OF DATA FLOW PATHS IN THE SET OF CONTROL FLOW CHAINS CORRESPONDING TO EACH RESPECTIVE PROGRAM OF THE PLURALITY OF PROGRAMS CALLED BY A PARTICULAR JOB STEP OF A PLURALITY OF JOB STEPS IN EACH RESPECTIVE JOB OF THE PLURALITY OF JOBS IN THE SEQUENCE OF JOB EXECUTION

FROM FIG. 10B

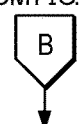

1024 — IDENTIFY, BY THE COMPUTER, A PARTICULAR FIELD OF THE PLURALITY OF FIELDS IN A RECORD OF EACH DATASET OF THE PLURALITY OF DATASETS OR A PARTICULAR FIELD OF A PLURALITY OF FIELDS IN A DATABASE TABLE OR SEGMENT OF EACH DATABASE OF A PLURALITY OF DATABASES CORRESPONDING TO THE MAINFRAME APPLICATION THAT IS INCLUDED IN A PARTICULAR DATA FLOW PATH OF THE PLURALITY OF DATA FLOW PATHS TO FORM THE FIELD LEVEL DATA FLOW ANALYSIS FOR EACH PARTICULAR DATA FLOW PATH IN RESPONSE TO PERFORMING THE PROGRAM LEVEL DATA FLOW ANALYSIS FOR EACH RESPECTIVE DATA FLOW PATH OF THE PLURALITY OF DATA FLOW PATHS IN THE SET OF CONTROL FLOW CHAINS CORRESPONDING TO EACH RESPECTIVE PROGRAM OF THE PLURALITY OF PROGRAMS CALLED BY THE PARTICULAR JOB STEP OF THE PLURALITY OF JOB STEPS IN EACH RESPECTIVE JOB OF THE PLURALITY OF JOBS IN THE SEQUENCE OF JOB EXECUTION

1026 — AGGREGATE, BY THE COMPUTER, RESULTS OF THE FIELD LEVEL DATA FLOW ANALYSIS FOR EACH PARTICULAR DATA FLOW PATH IN THE PLURALITY OF DATA FLOW PATHS IN THE SET OF CONTROL FLOW CHAINS CORRESPONDING TO EACH RESPECTIVE PROGRAM OF THE PLURALITY OF PROGRAMS CALLED BY THE PARTICULAR JOB STEP OF THE PLURALITY OF JOB STEPS IN EACH RESPECTIVE JOB OF THE PLURALITY OF JOBS IN THE SEQUENCE OF JOB EXECUTION TO FORM AGGREGATED RESULTS OF THE FIELD LEVEL DATA FLOW ANALYSIS

1028 — OUTPUT, BY THE COMPUTER, THE AGGREGATED RESULTS OF THE FIELD LEVEL DATA FLOW ANALYSIS FOR EACH PARTICULAR DATA FLOW PATH IN THE PLURALITY OF DATA FLOW PATHS IN THE SET OF CONTROL FLOW CHAINS CORRESPONDING TO EACH RESPECTIVE PROGRAM OF THE PLURALITY OF PROGRAMS CALLED BY THE PARTICULAR JOB STEP OF THE PLURALITY OF JOB STEPS IN EACH RESPECTIVE JOB OF THE PLURALITY OF JOBS IN THE SEQUENCE OF JOB EXECUTION TO THE USER VIA THE CLIENT DEVICE

1030 — OPTIMIZE, BY THE COMPUTER, THE MAINFRAME APPLICATION BASED ON THE AGGREGATED RESULTS OF THE FIELD LEVEL DATA FLOW ANALYSIS FOR EACH PARTICULAR DATA FLOW PATH IN THE PLURALITY OF DATA FLOW PATHS IN THE SET OF CONTROL FLOW CHAINS CORRESPONDING TO EACH RESPECTIVE PROGRAM OF THE PLURALITY OF PROGRAMS CALLED BY THE PARTICULAR JOB STEP OF THE PLURALITY OF JOB STEPS IN EACH RESPECTIVE JOB OF THE PLURALITY OF JOBS IN THE SEQUENCE OF JOB EXECUTION

END

FIG. 10C

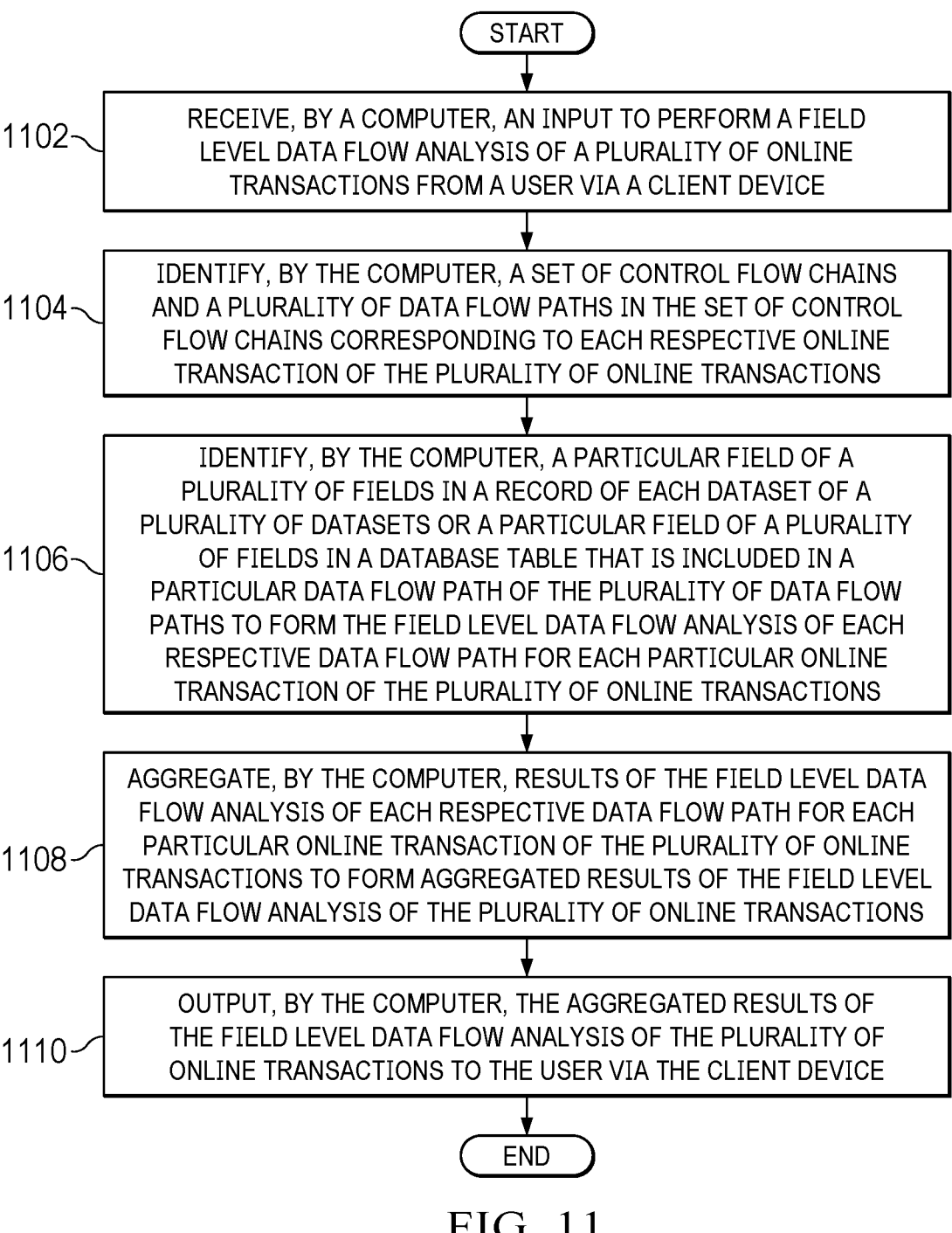

START

1102 — RECEIVE, BY A COMPUTER, AN INPUT TO PERFORM A FIELD LEVEL DATA FLOW ANALYSIS OF A PLURALITY OF ONLINE TRANSACTIONS FROM A USER VIA A CLIENT DEVICE

1104 — IDENTIFY, BY THE COMPUTER, A SET OF CONTROL FLOW CHAINS AND A PLURALITY OF DATA FLOW PATHS IN THE SET OF CONTROL FLOW CHAINS CORRESPONDING TO EACH RESPECTIVE ONLINE TRANSACTION OF THE PLURALITY OF ONLINE TRANSACTIONS

1106 — IDENTIFY, BY THE COMPUTER, A PARTICULAR FIELD OF A PLURALITY OF FIELDS IN A RECORD OF EACH DATASET OF A PLURALITY OF DATASETS OR A PARTICULAR FIELD OF A PLURALITY OF FIELDS IN A DATABASE TABLE THAT IS INCLUDED IN A PARTICULAR DATA FLOW PATH OF THE PLURALITY OF DATA FLOW PATHS TO FORM THE FIELD LEVEL DATA FLOW ANALYSIS OF EACH RESPECTIVE DATA FLOW PATH FOR EACH PARTICULAR ONLINE TRANSACTION OF THE PLURALITY OF ONLINE TRANSACTIONS

1108 — AGGREGATE, BY THE COMPUTER, RESULTS OF THE FIELD LEVEL DATA FLOW ANALYSIS OF EACH RESPECTIVE DATA FLOW PATH FOR EACH PARTICULAR ONLINE TRANSACTION OF THE PLURALITY OF ONLINE TRANSACTIONS TO FORM AGGREGATED RESULTS OF THE FIELD LEVEL DATA FLOW ANALYSIS OF THE PLURALITY OF ONLINE TRANSACTIONS

1110 — OUTPUT, BY THE COMPUTER, THE AGGREGATED RESULTS OF THE FIELD LEVEL DATA FLOW ANALYSIS OF THE PLURALITY OF ONLINE TRANSACTIONS TO THE USER VIA THE CLIENT DEVICE

END

FIG. 11

MULTIPLE GRANULARITY DATA FLOW ANALYSIS IN MAINFRAME APPLICATIONS

BACKGROUND

The disclosure relates generally to comprehensive data flow analysis and more specifically to data flow analysis of mainframe applications.

Data flow analysis is the process of collecting information regarding the way data flows or moves through an application or program. Data flow analysis attempts to obtain particular information at each point in the application. Basically, data flow analysis models the application or program as a knowledge graph, where nodes in the graph represent program entities and edges represent relationships (e.g., data flow dependencies) between the program entities. Data flow information is then propagated through the knowledge graph.

SUMMARY

According to one illustrative embodiment, a computer-implemented method for data flow analysis is provided. A computer performs a program level data flow analysis for each respective data flow path of a plurality of data flow paths in a set of control flow chains corresponding to each respective program of a plurality of programs called by a particular job step of a plurality of job steps in each respective job of a plurality of jobs in a sequence of job execution corresponding to an application. The computer identifies a particular field of a plurality of fields in a record of each dataset of a plurality of datasets corresponding to the application that is included in a particular data flow path of the plurality of data flow paths to form a field level data flow analysis for each particular data flow path in response to performing the program level data flow analysis. The computer aggregates results of the field level data flow analysis for each particular data flow path in the plurality of data flow paths in the set of control flow chains corresponding to each respective program of the plurality of programs called by the particular job step of the plurality of job steps in each respective job of the plurality of jobs in the sequence of job execution to form aggregated results of the field level data flow analysis. According to other illustrative embodiments, a computer system and computer program product for data flow analysis are provided.

BRIEF DESCRIPTION OF THE DRAWINGS

FIGS. 10A-10C are a flowchart illustrating a process for data flow analysis in accordance with an illustrative embodiment; and FIG. 11 is a flowchart illustrating a process for online transaction data flow analysis in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
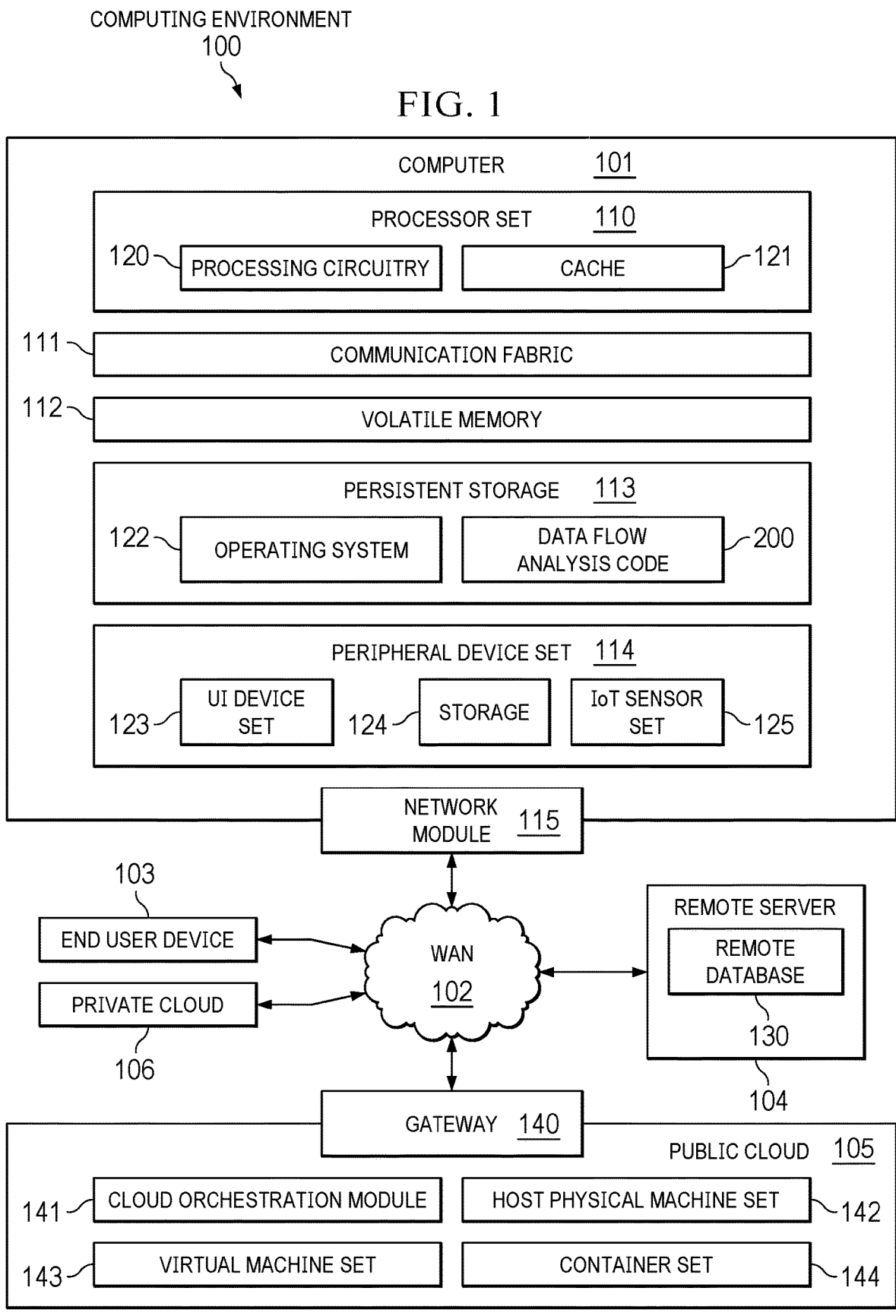
FIG. 1 is a pictorial representation of a computing environment in which illustrative embodiments may be implemented.
Figure 2:
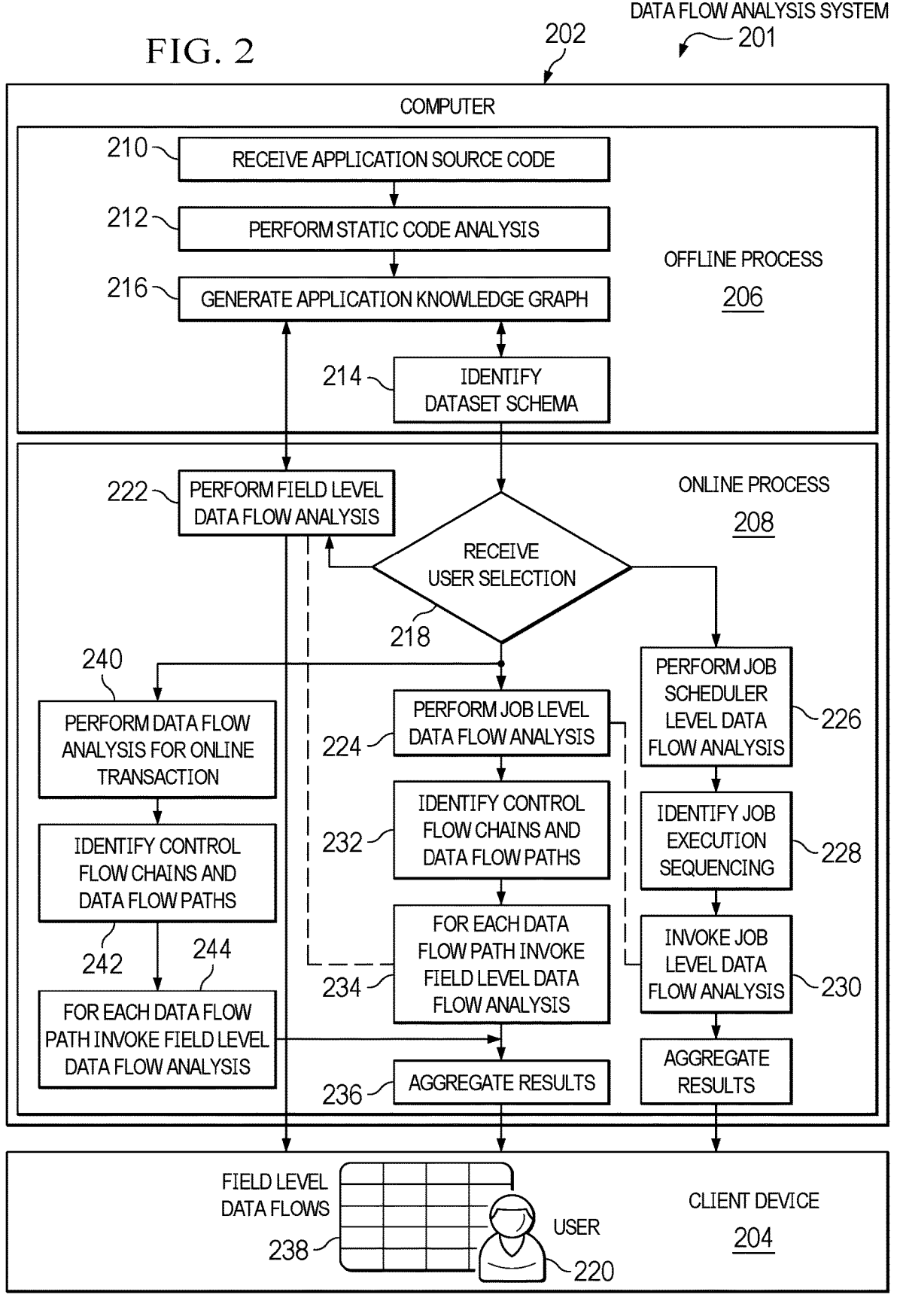
FIG. 2 is a diagram illustrating an example of a data flow analysis system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as data flow analysis code 200. For example, data flow analysis code 200 traces and tracks data flow paths through a mainframe application to understand how data is transformed from a source dataset to a target dataset within the mainframe system. Data flow analysis code 200 performs a static analysis of source code of the mainframe application to generate a knowledge graph of that mainframe application to identify all the entities corresponding to the mainframe application, along with relationships between those entities. Then, data flow analysis code 200 performs a field level data flow analysis that is record layout-centric covering multiple granularity levels (e.g., at the program level across lines of program code, at the job level across programs, and at the job scheduler level across jobs) and identifying all possible data flow paths between datasets in the mainframe system.

In addition to data flow analysis code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data flow analysis code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in data flow analysis code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a customer of an entity that operates computer 101), and may take any of the forms discussed above in connection with computer 101. EUD 103 typically receives helpful and useful data from the operations of computer 101. For example, in a hypothetical case where computer 101 is designed to provide a field level data flow analysis to the end user, this field level data flow analysis would typically be communicated from network module 115 of computer 101 through WAN 102 to EUD 103. In this way, EUD 103 can display, or otherwise present, the recommendation to the end user. In some embodiments, EUD 103 may be a client device, such as thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a data flow analysis based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors.

Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Understanding data flow at multiple granularity levels is needed for modernizing and maintaining applications in mainframe systems, application testing, application discovery, data modernization, data migration, and the like. As used herein, multiple granularity means a plurality of different levels of granularity varying from mainframe application to dataset level to a level of program and individual fields inside a record of a dataset.

Mainframe applications have been developed over decades spanning over tens of thousands of programs and tables. It should be noted that a mainframe application is comprised of a plurality of programs. Documentation for these mainframe applications often does not exist or the existing documentation is obsolete. As a result, a large technical debt exists for these mainframe applications. Illustrative embodiments reduce this technical debt by discovery of these mainframe applications.

In addition, when modernizing, restructuring, maintaining, or adding new features to these mainframe applications, it is important to understand the possible change impact on other components of the mainframe system. Illustrative embodiments perform an analysis on these mainframe applications to understand this change impact.

Further, a way to scope out a given business function of a mainframe application for modernization is by scoping out the relevant data flows of the business function. Once illustrative embodiments scope out the relevant data flows of the business function, illustrative embodiments understand, for example: 1) the inputs and outputs of the business function; 2) the data lineage and data coupling (i.e., domain affinities) between the business function and other business functions; and 3) the data modernization patterns that will help isolate the inputs and outputs and reduce the data coupling with the other business functions.

Data flow in mainframe application code takes place at three levels. One level is data flow within a program (i.e., data flow across lines of program code) of the mainframe application. For example, a program has thousands of lines of code, and the data flow or data movement occurs across these lines of code. Another level is data flow within a job (i.e., data flow among programs of the mainframe application run by the job). For example, a job is comprised of a plurality of steps, where each respective step can run a different main program, which can call multiple sub-programs, and pass a dataset to another step in the job. Yet another level is data flow across jobs. For example, a job scheduler determines the order of execution of a plurality of jobs utilizing job control language code (i.e., the job control language code identifies the order of job execution). The job control language also allows conditional execution of job steps, thus creating multiple control flow chains. Also, a dataset generated at a particular job step may be read by a program at a later job step in the control flow, thus creating different data flow paths.

Furthermore, mainframe applications can utilize schema-less datasets. As a result, identifying the record layout for these schema-less datasets is not straightforward. Consequently, a detailed analysis needs to be performed to identify the programs reading from and writing to these datasets and the data record definition that these datasets utilize, which may be defined in separate files called copybooks. A copybook is a common piece of code designed to be copied into multiple programs. Programming languages, such as, for example, Common Business-Oriented Language (COBOL), allow for redefining of a record layout in a dataset to multiple possible record layouts. A COBOL copybook is a section of code that defines the record layouts (e.g., data structures) of COBOL programs. Identifying the exact record layout of a dataset used by a particular program for a particular data flow path is nontrivial. It should be noted that a dataset is the same as a data file in mainframe terminology. A dataset or data file contains a set of one or more data records. A data record contains a set of one or more data fields. Also, datasets are stored in physical data storage units of the mainframe system.

A current solution, Application Discovery and Delivery Intelligence (ADDI), supports data lineage tracing. ADDI is an analytical platform for application modernization that is designed to help developers and architects discover and analyze relationships between application components, datasets, and jobs. For example, ADDI can perform field level data flow analysis inside a program (i.e., at the program level). However, ADDI has some limitations, such as for two given dataset endpoints (e.g., source and target datasets), ADDI does not explore every possible data flow path between the two datasets. Instead, ADDI stops when ADDI finds the first data flow path. In contrast, illustrative embodiments explore and identify all possible data flow paths between datasets. Consequently, the data flow analysis of illustrative embodiments is comprehensive. Also, ADDI cannot differentiate between data flows for different record layouts of the same record in the datasets. In contrast, illustrative embodiments perform a record layout-centric analysis that enables fine-grained data flow analysis results. Moreover, ADDI cannot perform a field level analysis for a job (i.e., at the job level). Instead, ADDI performs a dataset level data flow analysis (i.e., identify data flow paths at a dataset read/write level). This dataset level data flow analysis performed by ADDI obtains many false positives. For example, ADDI does not necessarily obtain four data flows in a job with two input datasets and two output datasets.

No current solution exists that provides a field level data flow analysis that is record layout-centric covering all multiple granularity levels (e.g., at the program level across lines of program code, at the job level across programs, and at the job scheduler level across jobs) and identifying all possible data flow paths between a combination of datasets and databases (e.g. DB2, IMS DB, IDMS, and the like).

Illustrative embodiments trace and track the flow of data (i.e., data flow paths) in a mainframe application scoped to the different granularity levels, such as, for example, programs, jobs, and job schedulers, considering both schema-less datasets and schema-aware datasets. Illustrative embodiments receive as input source code of the mainframe application, the selected granularity level (i.e., program, job, or job scheduler), name of the selected granularity level, dataset or table type, and dataset or table/segment name. Illustrative embodiments then output the data flow paths between datasets at the selected granularity level.

Illustrative embodiments perform the dataset record layout-centric identification and tracking by identifying all record layouts in a dataset used by multiple programs of a mainframe application and track the use of each respective record layout separately. Illustrative embodiments also perform field level data flow identification at the program level for all possible data flow paths. For example, for a given program, dataset, and direction (e.g., forward direction from source dataset to target dataset or backward direction from target dataset to source dataset), illustrative embodiments perform data flow path analysis across all called programs from the given program considering the possibility of multiple schemas for schema-less datasets in, for example, a virtual storage access method, an information management system, or the like. In addition, illustrative embodiments perform field level data flow analysis at the job level for all possible data flow paths. For example, for a given job, illustrative embodiments identify all the control flow chains and data flow paths from the job control language code and track all the data being passed through the datasets across the programs invoked by the different job steps of the given job. Furthermore, illustrative embodiments perform field level data flow analysis at the job scheduler level for all possible data flow paths. For example, for a given job scheduler, illustrative embodiments identify the data flow paths across different jobs. The same applies for online applications where programs are invoked by a CICS or IMS Transactions, and use datasets, and databases within a nested program flow. The combination of the Batch and Online coverage allows for capturing all relations of shared datasets and databases regardless of the application type they are used in.

Unlike some of the modern data stores for datasets, mainframe data stores (e.g., VSAM) do not have schema detection services. Therefore, a need exists to analyze mainframe application source code and track Input/Output (I/O) operations on datasets of these mainframe data stores to identify the record layout or record structure of a given dataset. I/O operations include, for example, read operations, write operations, and the like. Illustrative embodiments identify the program record or variable used to perform a particular I/O operation. Once illustrative embodiments identify the program record or variable, illustrative embodiments perform a record flattening operation to identify the different record layouts corresponding to a given program variable as certain programming languages, such as, for example, COBOL, support the redefining of record layouts.

For a given source dataset, illustrative embodiments identify all the programs performing I/O's on the given dataset, along with the corresponding program variables. Illustrative embodiments perform a program variable flattening operation to identify the different record layouts of the given dataset. Illustrative embodiments then collect the different record layouts and prune the different record layouts to identify any unique record layouts present in the given dataset. A record layout identifies the sequence of fields in a record, along with metadata of each field, such as, for example, field size, field data type, field usage type, and the like.

Thus, illustrative embodiments provide one or more technical solutions that overcome a technical problem with an inability of known solutions to perform a field level data flow analysis that is record layout-centric covering multiple granularity levels and all possible data flow paths between datasets. As a result, these one or more technical solutions provide a technical effect and practical application in the field of data flow analysis.

With reference now to FIG. 2, a diagram illustrating an example of a data flow analysis system is depicted in accordance with an illustrative embodiment. Data flow analysis system 201 may be implemented in a computing environment, such as computing environment 100 in FIG. 1. Data flow analysis system 201 is a system of hardware and software components for providing a field level data flow analysis that is record layout-centric covering all of the multiple granularity levels (e.g., at the program level across lines of program code (i.e., statements that move or manipulate data), at the job level across programs in job steps, and at the job scheduler level across jobs) and identifying all possible data flow paths between a plurality of datasets corresponding to a selected mainframe application.

In this example, data flow analysis system 201 includes computer 202 and client device 204. Computer 202 may be, for example, computer 101 in FIG. 1. Client device 204 may be, for example, EUD 103 in FIG. 1. However, it should be noted that data flow analysis system 201 is intended as an example only and not as a limitation on illustrative embodiments. For example, data flow analysis system 201 can include any number of computers and client devices, along with other devices and components not shown.

Computer 202 includes offline process 206 and online process 208. At 210, computer 202 receives source code of the selected mainframe application to be analyzed for data flow. It should be noted that the source code includes job control language code for jobs corresponding to the selected mainframe application. At 212, computer 202 performs static code analysis of the source code of the selected mainframe application to identify entities corresponding to the selected mainframe application, along with relationships between the entities. At 214, the computer also identifies the schema (e.g., record layout) of each respective dataset corresponding to the selected mainframe application. At 216, the computer generates an application knowledge graph of the selected mainframe application based on the identified entities corresponding to the selected mainframe application and their relationships and the identified schema of each respective dataset corresponding to the selected mainframe application.

At 218, the computer receives a selection from user 220 via client device 204. The user selection is to perform one of field level data flow analysis 222, job level data flow analysis 224, or job scheduler level data flow analysis 226. In this example, user 220 selects job scheduler level data flow analysis 226. As a result, at 228, the computer, utilizing information contained in the application knowledge graph, identifies the sequence of job execution of a plurality of jobs corresponding to the selected mainframe application. At 230, the computer invokes job level data flow analysis 224 for each respective job of the plurality of jobs corresponding to the selected mainframe application in the sequence of job execution.

At 232, the computer identifies a set of control flow chains and a plurality of data flow paths in the set of control flow chains corresponding to each respective job of the plurality of jobs. At 234, the computer invokes field level data flow analysis 222 for each respective data flow path of the plurality of data flow paths in the set of control flow chains corresponding to each respective job of the plurality of jobs to identify a particular field of a plurality of fields in a record of each dataset of a plurality of datasets corresponding to the selected mainframe application that is included in a particular data flow path.

At 236, the computer aggregates the results of field level data flow analysis 222 for each respective data flow path in the plurality of data flow paths in the set of control flow chains corresponding to each respective job of the plurality of jobs. At 238, the computer outputs the field level data flow paths of the selected mainframe application to user 220 via client device 204. In addition, the computer utilizes the field level data flow paths of the selected mainframe application to automatically optimize and modernize the selected mainframe application.

Returning to 218, the user can also select to perform data flow analysis for online transaction 240. At 242, the computer identifies a set of control flow chains and a plurality of data flow paths in the set of control flow chains corresponding to each respective job of the plurality of jobs. At 244, the computer invokes field level data flow analysis 222 for each respective data flow path of the plurality of data flow paths in the set of control flow chains corresponding to each respective job of the plurality of jobs to identify a particular field of a plurality of fields in a record of each dataset of a plurality of datasets corresponding to the selected mainframe application that is included in a particular data flow path. Then, returning to 236, the computer aggregates the results of field level data flow analysis 222 for each respective data flow path in the plurality of data flow paths in the set of control flow chains corresponding to each respective job of the plurality of jobs.

Figure 3:
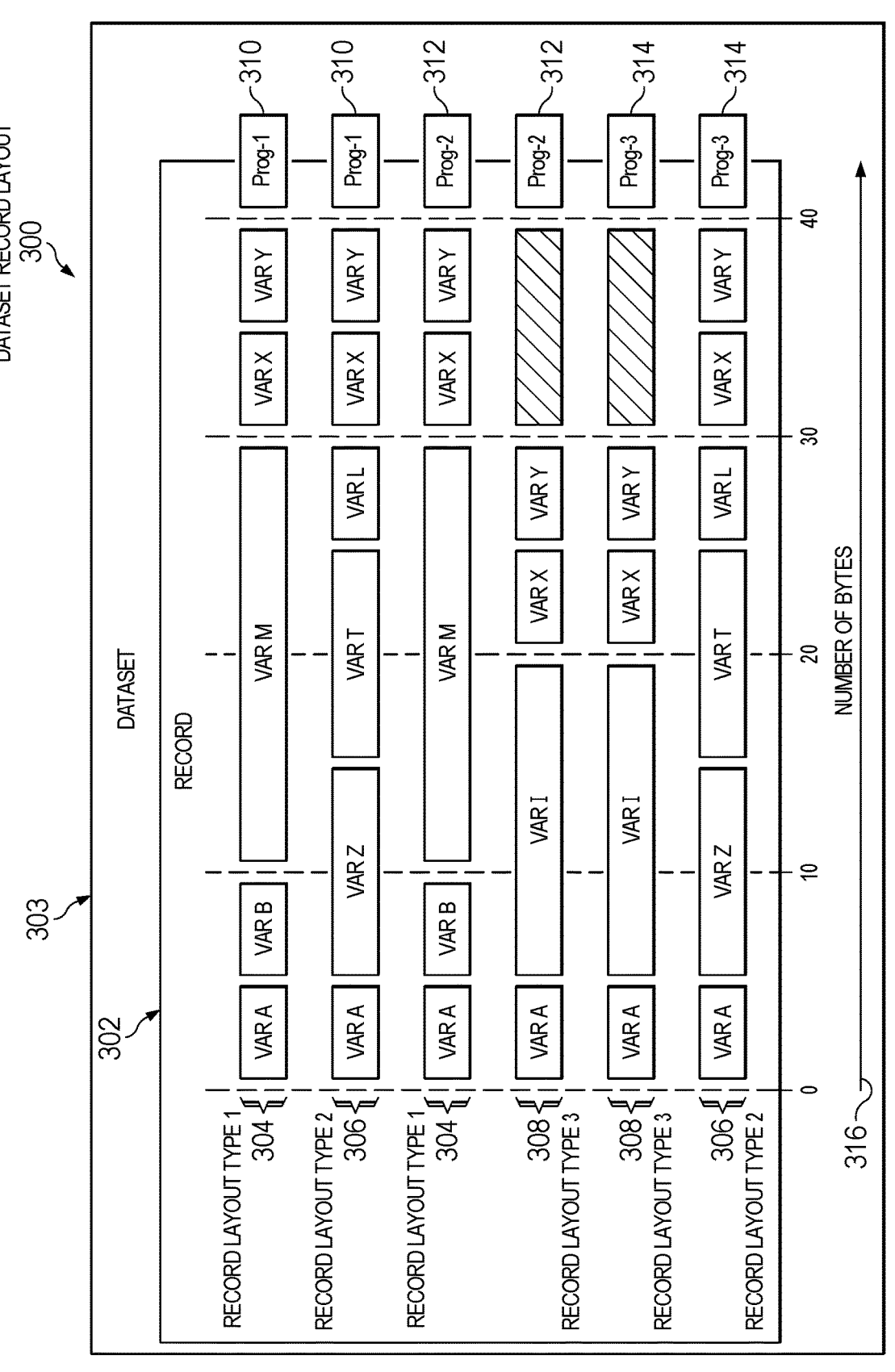
FIG. 3 is a diagram illustrating an example of a dataset record layout in accordance with an illustrative embodiment.

With reference now to FIG. 3, a diagram illustrating an example of a dataset record layout is depicted in accordance with an illustrative embodiment. Dataset record layout 300 represents specific examples of different record layout types or structures of record 302, which is located in dataset 303 corresponding to the selected mainframe application.

In this example, record 302 includes record layout type-1 304, record layout type-2 306, and record layout type-3 308. However, record 302 is intended as an example only and not as a limitation on illustrative embodiments. In other words, record 302 can have any number and type of record layouts.

Also, it should be noted that program-1 310 utilizes record layout type-1 304 and record layout type-2 306. Program-2 312 utilizes record layout type-1 304 and record layout type-3 308. Program-3 314 utilizes record layout type-3 308 and record layout type-2 306. In other words, different programs utilize different types of record layouts. In addition, dataset record layout 300 indicates number of bytes 316 corresponding to each of the different types of record layouts.

Figure 4:
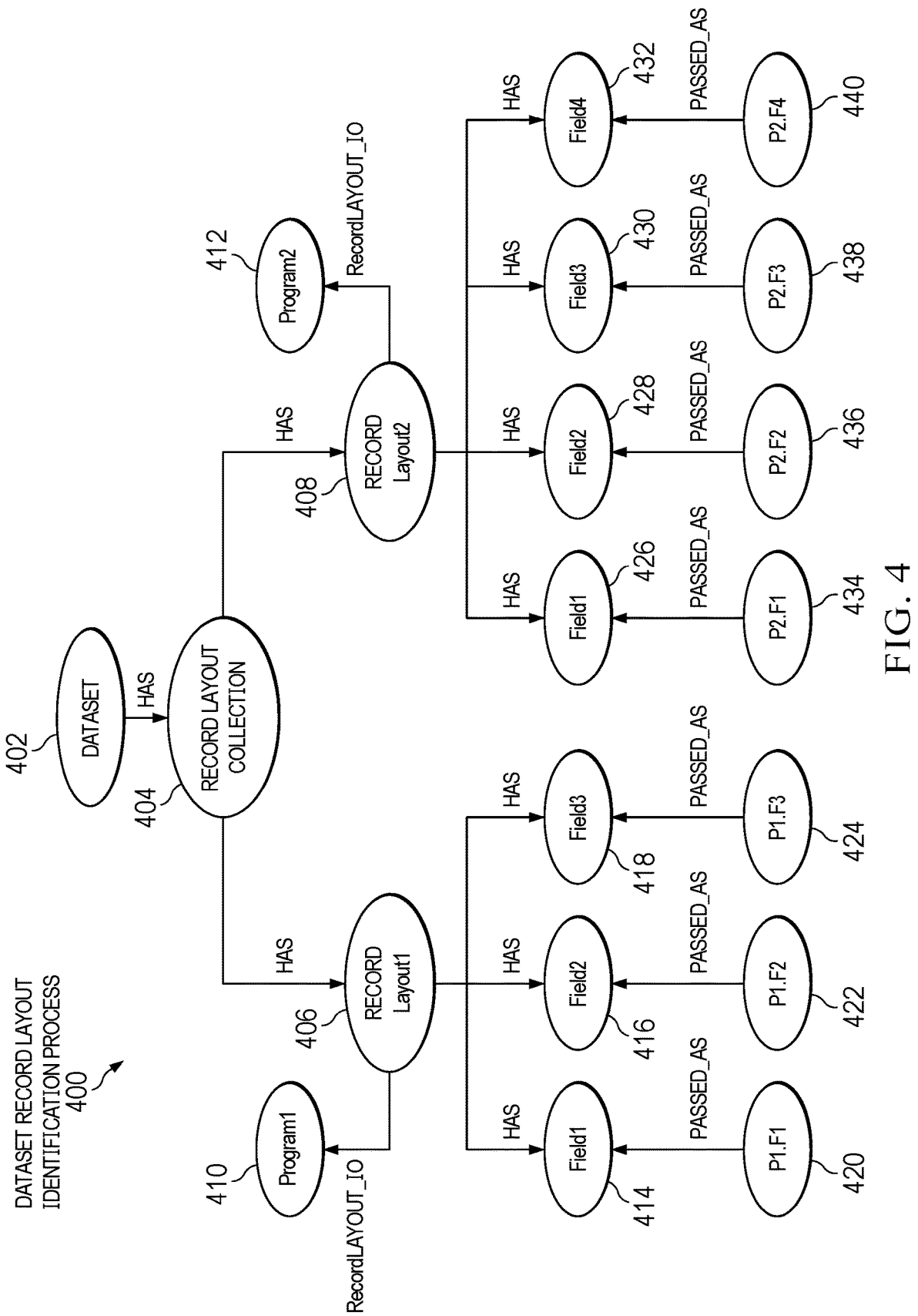
FIG. 4 is a diagram illustrating an example of a dataset record layout identification process in accordance with an illustrative embodiment.

With reference now to FIG. 4, a diagram illustrating an example of a dataset record layout identification process is depicted in accordance with an illustrative embodiment. Dataset record layout identification process 400 can be implemented in a computer, such as, for example, computer 101 in FIG. 1 or computer 202 in FIG. 2. For example, dataset record layout identification process 400 can be implemented by data flow analysis code 200 in FIG. 1.

In this example, dataset record layout identification process 400 includes dataset 402. Dataset 402 has record layout collection 404. Record layout collection 404 has record layout-1 406 and record layout-2 408. Program-1 410 performs I/O operations on record layout-1 406. Program-2 412 performs I/O operations on record layout-2 408. However, it should be noted that any number of programs can perform I/O operations on record layout-1 406 and record layout-2 408.

Record layout-1 406 has field-1 414, field-2 416, and field-3 418. Field-1 414 is passed as P1.F1 420, field-2 416 is passed as P1.F2 422, and field-3 418 is passed as P1.F3 424. Record layout-2 408 has field-1 426, field-2 428, field-3 430, and field-4 432. Field-1 426 is passed as P2.F1 434, field-2 428 is passed as P2.F2 436, field-3 430 is passed as P2.F3 438, and field-4 432 is passed as P2.F4 440. However, it should be noted that record layout-1 406 and record layout-2 408 can include any number of data fields.

Figure 5:
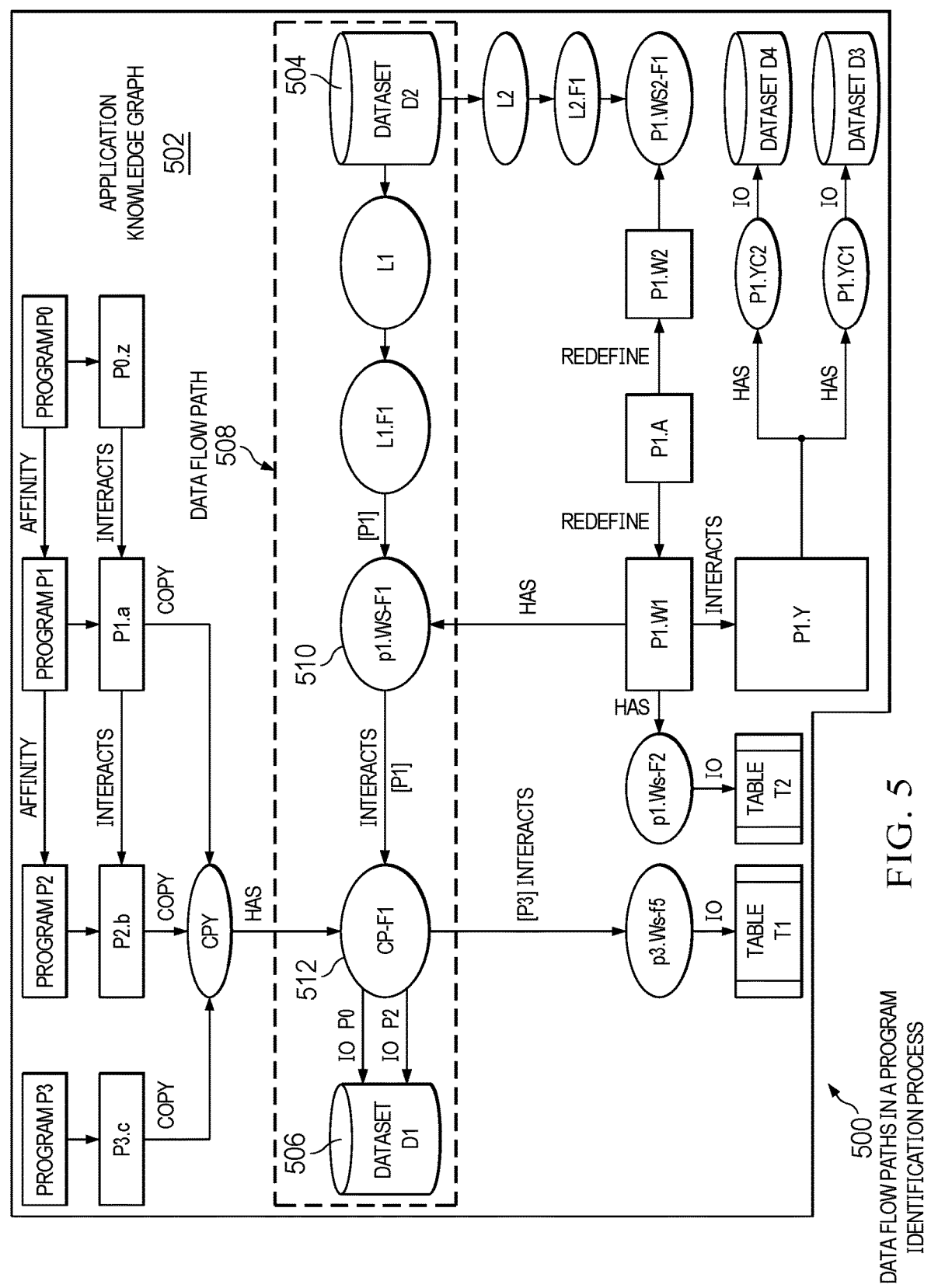
FIG. 5 is a diagram illustrating an example of a data flow paths in a program identification process in accordance with an illustrative embodiment.

With reference now to FIG. 5, a diagram illustrating an example of a data flow paths in a program identification process is depicted in accordance with an illustrative embodiment. Data flow paths in a program identification process 500 can be implemented in a computer, such as, for example, computer 101 in FIG. 1 or computer 202 in FIG. 2. For example, data flow paths in a program identification process 500 can be implemented by data flow analysis code 200 in FIG. 1.

In this example, the computer generates application knowledge graph 502 of the selected mainframe application. Application knowledge graph 502 shows all of the entities (e.g., programs, program variables, program calls, datasets, tables, and the like) corresponding to the selected mainframe application, along with the relationships between the entities. The computer utilizes application knowledge graph 502 to identify program level data flow paths in the selected mainframe application. The computer exploits the relationships between the entities in application knowledge graph 502. The relationships between the entities in application knowledge graph 502 include, for example: 1) I/O relationship between each respective dataset and each respective program variable used to perform a particular I/O operation on that dataset; 2) parent-child relationships corresponding to program records; 3) relationship between each respective data flow path within a program and each respective record layout; and 4) relationship between program calls identifying programs using the same instance of a copybook containing the record layouts.

In response to the computer identifying a read operation from a source dataset, such as, dataset D2 504, the computer begins traversal of application knowledge graph 502 to identify whether any write operation has been performed on that dataset. In addition, the computer identifies the record layouts of that dataset. The computer utilizes the identified record layouts to determine which specific record layout influences a particular data flow path, along with the exact byte positions of the data in that specific record layout. For example, the computer reads data from dataset D2 504 and inserts the data into dataset D1 506 via data flow path 508 (i.e., dataset D2 504 to P1.WS-F1 510 to CP-F1 512 to dataset D1 506). Furthermore, the computer imposes a set of conditions to ensure that no false positives, such as, for example, field level byte position alignment, detection of the same copybook instance passed within a program call chain, record layout redefines by certain programming languages, and the like, are obtained.

Figure 6:
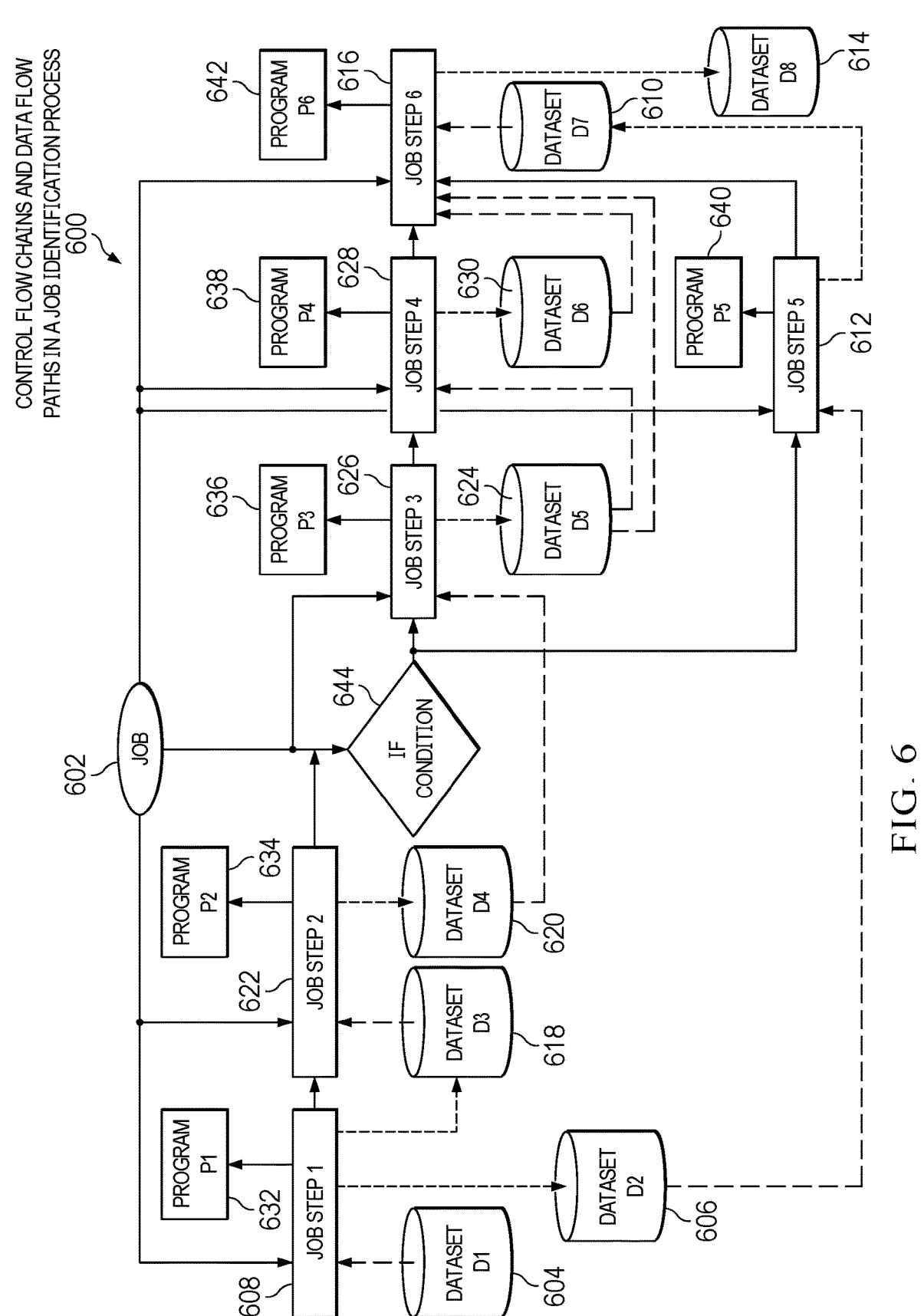
FIG. 6 is a diagram illustrating an example of a control flow chains and data flow paths in a job identification process in accordance with an illustrative embodiment.

With reference now to FIG. 6, a diagram illustrating an example of a control flow chains and data flow paths in a job identification process is depicted in accordance with an illustrative embodiment. Control flow chains and data flow paths in a job identification process 600 can be implemented in a computer, such as, for example, computer 101 in FIG. 1 or computer 202 in FIG. 2. For example, control flow chains and data flow paths in a job identification process 600 can be implemented by data flow analysis code 200 in FIG. 1.

The computer identifies both data flow chains and control flow paths in job 602. A job executes a sequence of job steps, which in turn identifies the program needed to execute each particular job step, the input dataset of each particular job step, the output dataset of each particular job step, and any needed parameters. In addition, a job has the ability to define a conditional statement (i.e., denoted by an if condition in the job control language code), which determines which job step to execute next in the sequence of job steps. For example, control flow chain-1 includes job step-1 608 to job step-2 622 to job step-3 626 to job step-4 638 to job step-6 616, and control flow chain-2 includes job step-1 608 to job step-2 622 to job step-5 612 to job step-6 616 based on whether if condition 644 in the job control language code is true or false. As a result, illustrative embodiments need to identify the different control flow chains for job 602.

In response to the computer identifying the different control flow chains of job 602, the computer identifies the different data flow paths. A data flow path is a sequence of dataset-job step pairs, where each dataset produced as output from a previous job step is consumed as input in a subsequent or later job step. For example, data flow path-1 includes dataset D1 604 going to dataset D2 606 via job step-1 608, dataset D2 606 going to dataset D7 610 via job step-5 612, and dataset D7 610 going to dataset D8 614 via job step-6 616. Data flow path-2 includes dataset D1 604 going to dataset D3 618 via job step-1 608, dataset D3 618 going to dataset D4 620 via job step-2 622, dataset D4 620 going to dataset D5 624 via job step-3 626, and dataset D5 624 going to dataset D8 614 via job step-6 616. Data flow path-3 includes dataset D1 604 going to dataset D3 618 via job step-1 608, dataset D3 618 going to dataset D4 620 via job step-2 622, dataset D4 620 going to dataset D5 624 via job step-3 626, dataset D5 624 going to dataset D6 630 via job step-4 628, and dataset D6 630 going to dataset D8 614 via job step-6 616. It should be noted that each respective data flow path is within an identified control flow chain. Illustrative embodiments can identify such control flow chains and data flow paths by, for example, building dependency graphs.

Further, it should be noted that each respective job step in job 602 calls a particular program of the mainframe application. For example, job step-1 608 calls program P1 632, job step-2 622 calls program P2 634, job step-3 626 calls program P3 636, job step-4 628 calls program P4 638, job step-5 612 calls program P5 640, and job step-6 616 calls program P6 642.

Figure 7:
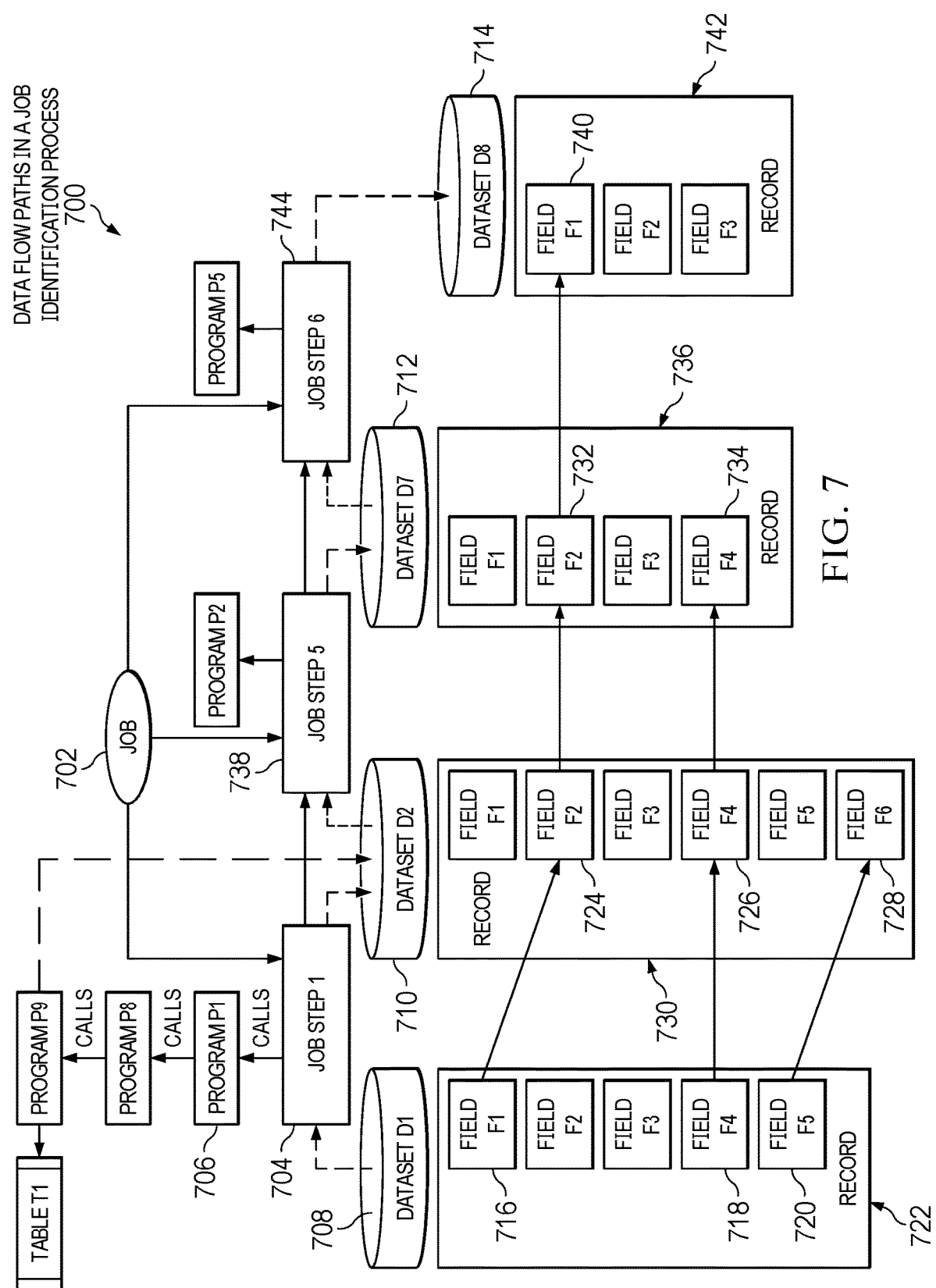
FIG. 7 is a diagram illustrating an example of a data flow paths in a job identification process in accordance with an illustrative embodiment.

With reference now to FIG. 7, a diagram illustrating an example of a data flow paths in a job identification process is depicted in accordance with an illustrative embodiment. Data flow paths in a job identification process 700 can be implemented in a computer, such as, for example, computer 101 in FIG. 1 or computer 202 in FIG. 2. For example, data flow paths in a job identification process 700 can be implemented by data flow analysis code 200 in FIG. 1.

While data flow paths provide the data flow between different datasets within a job, such as job 702, a data flow path can only be verified by providing evidence of data flow through certain data fields of a data record within a particular dataset in a program. Currently existing solutions only provide possible data flow paths between datasets via programs, but do not provide evidence of actual data flow taking place inside a program at the field level. In order to establish field level dependency between a pair of datasets, illustrative embodiments utilize program level data flow detection.

For example, job step-1 704 calls program P1 706, which takes as input dataset D1 708 and outputs dataset D2 710. Therefore, illustrative embodiments utilize the source code of program P1 706 to establish how the data flows or moves from one dataset to another dataset via the record fields. Illustrative embodiments start with the first pair of datasets (i.e., dataset D1 708 to dataset D2 710) in the data flow path and then shift right in the data flow path by 1 for each respective pair of datasets (e.g., dataset D2 710 to dataset D7 712 and then dataset D7 712 to dataset D8 714). While illustrative embodiments perform the shift right operation, illustrative embodiments also perform an analysis to identify how many data flow paths can be carried forward from a previous dataset pair to a subsequent dataset pair.

In this example, the data in field F1 716, field F4 718, and field F5 720 of record 722 within dataset D1 708 flows to field F2 724, field F4 726, and field F6 728, respectively, of record 730 within dataset D2 710 via job step-1 704. In addition, the data in field F2 724 and field F4 726 of record 730 within dataset D2 710 flows to field F2 732 and field F4 734, respectively, of record 736 within dataset D7 712 via job step-5 738. Further, the data in field F2 732 of record 736 within dataset D7 712 flows to field F1 740 of record 742 within dataset D8 714 via job step-6 744. It should be noted that illustrative embodiments disregard fields not included in a particular data flow path. Also, illustrative embodiments can perform a similar analysis in a backward direction (i.e., start at target dataset D8 714 and traverse backward through the data flow path between the dataset pairs to understand from where and how the data eventually arrived in dataset D8 714).

Figure 8:
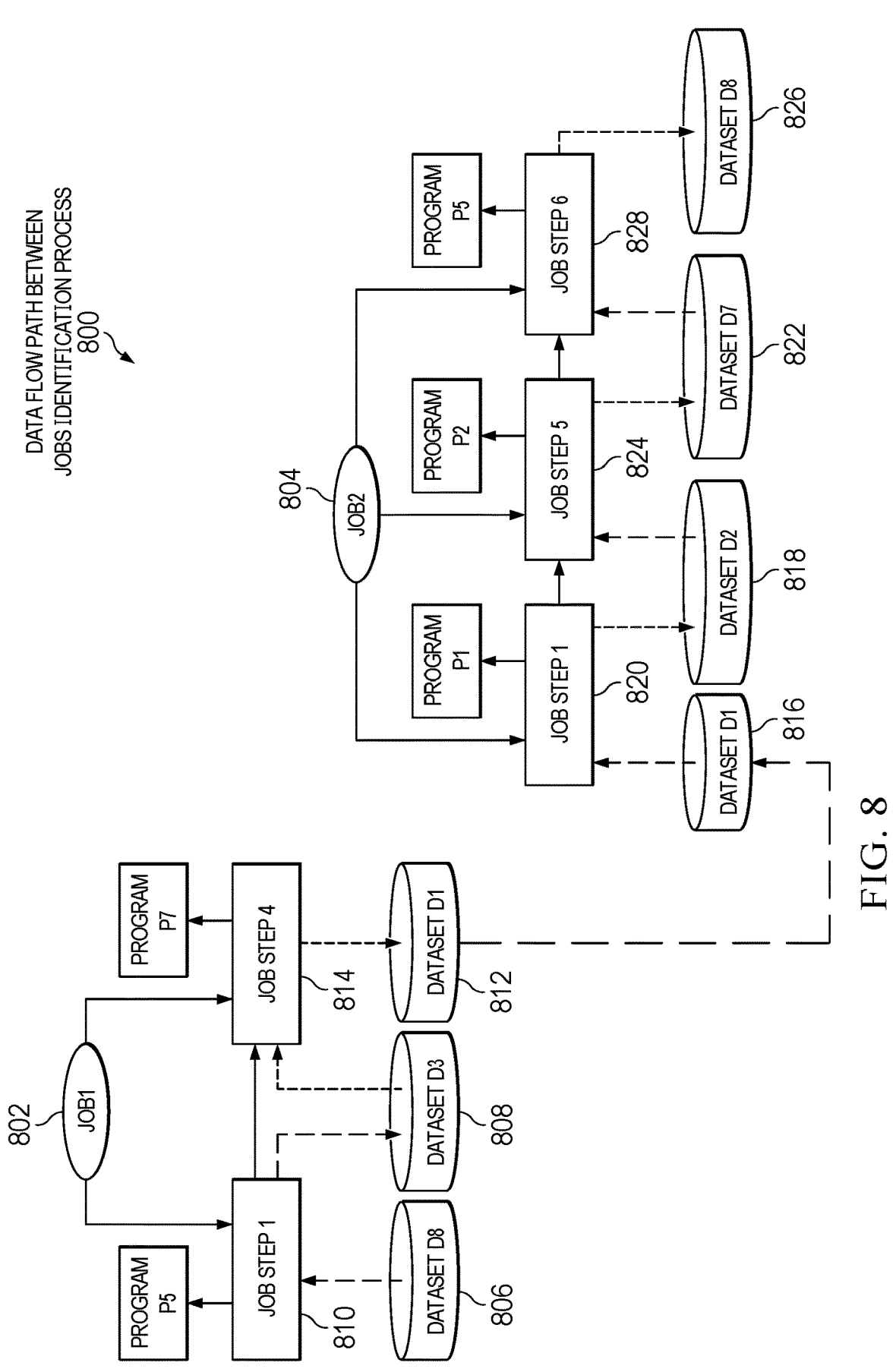
FIG. 8 is a diagram illustrating an example of a data flow path between jobs identification process in accordance with an illustrative embodiment.

With reference now to FIG. 8, a diagram illustrating an example of a data flow path between jobs identification process is depicted in accordance with an illustrative embodiment. Data flow path between jobs identification process 800 can be implemented in a computer, such as, for example, computer 101 in FIG. 1 or computer 202 in FIG. 2. For example, data flow path between jobs identification process 800 can be implemented by data flow analysis code 200 in FIG. 1.

While it is observed in the data flows within a job, such as job-1 802 or job-2 804, that a dataset produced as an output from one job step is consumed as an input in a subsequent or later job step in the job thereby creating a data dependency between job steps, it is unclear as to how the first dataset in the data flow path for a job was produced (possibly by a program in a job-step of another job) and how the last dataset in the data flow path will be consumed (again possibly by a program in a job-step of another job). By combining job scheduler information with the job level data flow paths, the computer can establish inter-job dependencies, where a dataset produced as a final output from one job is consumed as the first dataset input into another job. The job scheduler controls the sequence of execution of the jobs. The computer establishes the inter-job dependency by observing the first and last datasets in the data flow paths between jobs and then correlating them.

However, without the job execution sequence information from the job scheduler, the computer can only know that the data flow path from dataset D8 806 to dataset D3 808 via job step-1 810 and from dataset D3 808 to dataset D1 812 via job step-4 814 is part of job-1 802 and that the data flow path from dataset D1 816 to dataset D2 818 via job step-1 820, from dataset D2 818 to dataset D7 822 via job step-5 824, and from dataset D7 822 to dataset D8 826 via job step-6 828 is part of job-2 804. With the job execution sequence information obtained from the job scheduler, the computer knows that job-1 802 is executed first, followed by job-2 804. As a result, the computer can establish the relationship of the data flow chains between job-1 802 and job-2 804. For example, dataset D1 812 produced as an output from job-1 802 is consumed as an input by job-2 804 (i.e., dataset D1 816 is the same as dataset D1 812).

Figure 9:
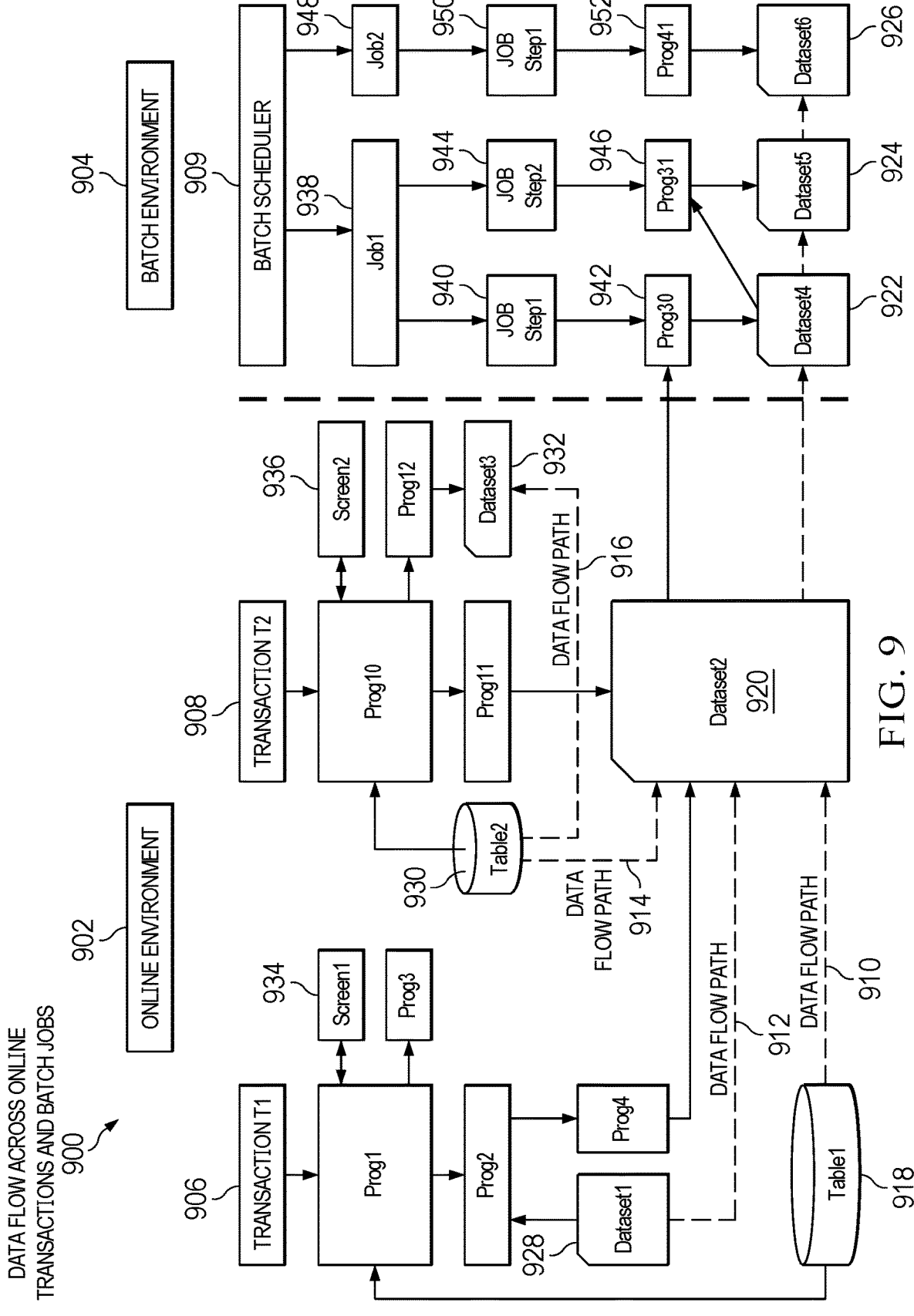
FIG. 9 is a diagram illustrating an example of data flow paths across online transactions and batch jobs in accordance with an illustrative embodiment.

With reference now to FIG. 9, a diagram illustrating an example of data flow paths across online transactions and batch jobs is shown in accordance with an illustrative embodiment. Data flow paths across online transactions and batch jobs 900 can be implemented in a computer, such as, for example, computer 101 in FIG. 1 or computer 202 in FIG. 2. For example, data flow paths across online transactions and batch jobs 900 can be implemented by data flow analysis code 200 in FIG. 1.

Data flow paths across online transactions and batch jobs 900 includes online environment 902 and batch environment 904. Online environment 902 includes transaction T1 906 and transaction T2 908. However, it should be noted that online environment 902 can include any number of online transactions. Batch environment includes batch scheduler 909.

The computer identifies data flow paths for each dataset or table. In this example, the computer identifies data flow path 910, data flow path 912, data flow path 914, and data flow path 916. Data flow path 910 includes table-1 918, dataset-2 920, dataset-4 922, dataset-5 924, and dataset-6 926. Data flow path 912 includes dataset-1 928, dataset-2 920, dataset-4 922, dataset-5 924, and dataset-6 926. Data flow path 914 includes table-2 930, dataset-2 920, dataset-4 922, dataset-5 924, and dataset-6 926. Data flow path 916 includes table-2 930 and dataset-3 932.

A data flow within an online transaction can be, for example, transaction T1 906 being invoked during the day and collects input from screen-1 934 and table-1 918. Transaction T1 906 then reads data from dataset-1 928 and combines the data into dataset-2 920.

A data flow across online transactions can be, for example, transaction T1 906 being invoked during the day and collects input from screen-1 934 and table-1 918. Transaction T1 906 then reads data from dataset-1 928 and combines the data into dataset-2 920. In addition, transaction T2 908 is invoked during the day and collects input from screen-2 936 and table-2 930. Transaction T2 908 then writes data into dataset-2 920 and also writes data into dataset-3 932.

A data flow across online transactions and batch jobs can be, for example, transaction T1 906 being invoked during the day and collects input from screen-1 934 and table-1 918. Transaction T1 906 then reads data from dataset-1 928 and combines the data into dataset-2 920. In addition, transaction T2 908 is invoked during the day and collects input from screen-2 936 and table-2 930. Transaction T2 908 then writes data into dataset-2 920 and also writes data into dataset-3 932. Batch scheduler 909 submits job-1 938 as part of nightly batch processing and picks up data that was processed during the day. Job step-1 940 executes program- 30 942, which reads data from dataset-2 920, manipulates the data, and stores a portion of the data in dataset-4 922. Also, job step-2 944 of job-1 938 executes program-31 946, which reads data from dataset-4 922, manipulates the data, and stores a portion of the data in dataset-5 924. Further, batch scheduler 909 submits job-2 948 as part of the nightly batch processing and picks up data that was processed during the day. Job step-1 950 of job-2 948 executes program-41 952, which reads data from dataset-5 924, manipulates the data, and stores a portion of the data in dataset-6 926.

With reference now to FIGS. 10A-10C, a flowchart illustrating a process for data flow analysis is shown in accordance with an illustrative embodiment. The process shown in FIGS. 10A-10C may be implemented in a computer, such as, for example, computer 101 in FIG. 1 or computer 202 in FIG. 2. For example, the process shown in FIGS. 10A-10C may be implemented by data flow analysis code 200 in FIG. 1.

The process begins when the computer receives an input to perform a field level data flow analysis of a mainframe application covering a plurality of granularity levels that includes a program level data flow analysis across lines of program code corresponding to the mainframe application, a job level data flow analysis across a plurality of programs corresponding to the mainframe application, and a job scheduler level data flow analysis across a plurality of jobs corresponding to the mainframe application from a user via a client device (step 1002). The computer retrieves source code of the mainframe application that includes job control language code corresponding to the plurality of jobs (step 1004). The computer performs a static code analysis of the source code of the mainframe application (step 1006).

The computer identifies entities corresponding to the mainframe application and relationships between the entities based on the static code analysis of the source code of the mainframe application (step 1008). The entities include the plurality of programs, the plurality of jobs, and a plurality of datasets corresponding to the mainframe application. In addition, the computer identifies a record layout of each respective dataset of the plurality of datasets corresponding to the mainframe application (step 1010). The record layout includes a sequence of a plurality of fields in a corresponding record of a particular dataset. The computer generates an application knowledge graph of the mainframe application based on the entities corresponding to the mainframe application, the relationships between the entities, and the record layout of each respective dataset of the plurality of datasets corresponding to the mainframe application (step 1012).

The computer performs the job scheduler level data flow analysis (step 1014). The computer identifies a sequence of job execution of the plurality of jobs corresponding to the mainframe application utilizing information contained in the application knowledge graph of the mainframe application in response to performing the job scheduler level data flow analysis (step 1016).

The computer performs the job level data flow analysis for each respective job of the plurality of jobs corresponding to the mainframe application in the sequence of job execution in response to identifying the sequence of job execution of the plurality of jobs (step 1018). The computer identifies a set of control flow chains and a plurality of data flow paths in the set of control flow chains corresponding to each respective job of the plurality of jobs in the sequence of job execution (step 1020).

The computer performs the program level data flow analysis for each respective data flow path of the plurality of data flow paths in the set of control flow chains corresponding to each respective program of the plurality of programs called by a particular job step of a plurality of job steps in each respective job of the plurality of jobs in the sequence of job execution (step 1022). The computer identifies a particular field of the plurality of fields in a record of each dataset of the plurality of datasets or a particular field of a plurality of fields in a database table or segment of each database of a plurality of databases corresponding to the mainframe application that is included in a particular data flow path of the plurality of data flow paths to form the field level data flow analysis for each particular data flow path in response to performing the program level data flow analysis for each respective data flow path of the plurality of data flow paths in the set of control flow chains corresponding to each respective program of the plurality of programs called by the particular job step of the plurality of job steps in each respective job of the plurality of jobs in the sequence of job execution (step 1024). The computer aggregates results of the field level data flow analysis for each particular data flow path in the plurality of data flow paths in the set of control flow chains corresponding to each respective program of the plurality of programs called by the particular job step of the plurality of job steps in each respective job of the plurality of jobs in the sequence of job execution to form aggregated results of the field level data flow analysis (step 1026).

The computer outputs the aggregated results of the field level data flow analysis for each particular data flow path in the plurality of data flow paths in the set of control flow chains corresponding to each respective program of the plurality of programs called by the particular job step of the plurality of job steps in each respective job of the plurality of jobs in the sequence of job execution to the user via the client device (step 1028). The computer optimizes the mainframe application based on the aggregated results of the field level data flow analysis for each particular data flow path in the plurality of data flow paths in the set of control flow chains corresponding to each respective program of the plurality of programs called by the particular job step of the plurality of job steps in each respective job of the plurality of jobs in the sequence of job execution (step 1030). Thereafter, the process terminates.

With reference now to FIG. 11, a flowchart illustrating a process for online transaction data flow analysis is shown in accordance with an illustrative embodiment. The process shown in FIG. 11 may be implemented in a computer, such as, for example, computer 101 in FIG. 1 or computer 202 in FIG. 2. For example, the process shown in FIG. 11 may be implemented by data flow analysis code 200 in FIG. 1.

The process begins when the computer receives an input to perform a field level data flow analysis of a plurality of online transactions from a user via a client device (step 1102). In response to receiving the input, the computer identifies a set of control flow chains and a plurality of data flow paths in the set of control flow chains corresponding to each respective online transaction of the plurality of online transactions (step 1104). In addition, the computer identifies a particular field of a plurality of fields in a record of each dataset of a plurality of datasets or a particular field of a plurality of fields in a database table that is included in a particular data flow path of the plurality of data flow paths to form the field level data flow analysis of each respective data flow path for each particular online transaction of the plurality of online transactions (step 1106).

The computer aggregates results of the field level data flow analysis of each respective data flow path for each particular online transaction of the plurality of online transactions to form aggregated results of the field level data flow analysis of the plurality of online transactions (step 1108). The computer outputs the aggregated results of the field level data flow analysis of the plurality of online transactions to the user via the client device (step 1110). Thereafter, the process terminates.

Thus, illustrative embodiments of the present disclosure provide a computer-implemented method, computer system, and computer program product for performing multiple granularity data flow analysis in mainframe applications across batch and online applications. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method executed by a computer, the method comprising:

receiving an input to perform a field level data flow analysis of a mainframe application, wherein the field level data flow analysis includes a program level data flow analysis across lines of program code corresponding to the mainframe application, a job level data flow analysis across a plurality of programs corresponding to the mainframe application, and a job scheduler level data flow analysis across a plurality of jobs corresponding to the mainframe application;

aggregating results of the field level data flow analysis for each particular data flow path in a plurality of data flow paths in a set of control flow chains corresponding to each respective program of the plurality of programs called by a particular job step of a plurality of job steps in each respective job of the plurality of jobs in a sequence of job execution corresponding to the mainframe application comprised of the plurality of programs to form aggregated results of the field level data flow analysis, wherein:

the program level data flow analysis is based on each respective data flow path of the plurality of data flow paths corresponding to each respective program of the plurality of programs called by the particular job step of the plurality of job steps in each respective job of the plurality of jobs in the sequence of job execution corresponding to the mainframe application comprised of the plurality of programs, each particular field of a plurality of fields in a record of each dataset of a plurality of datasets corresponds to the mainframe application that is included in a particular data flow path of the plurality of data flow paths forming the field level data flow analysis, the field level data flow analysis is based on all possible data flow paths between a combination of different database types and certain fields of records in the plurality of datasets used by the plurality of programs of the mainframe application at a program level, a job level, and a job scheduling level for each particular data flow path in response to the program level data flow analysis, a respective verification of each particular data flow path of the plurality of data flow paths is based on data flow between the certain fields of the records in the plurality of datasets used by the plurality of programs of the mainframe application to establish field level dependency between each respective pair of datasets in the plurality of datasets, and a unique layout of the records among a plurality of layouts influences a particular data flow path and byte positions of data in the unique layout, the plurality of layouts being based on a program variable flattening operation and an application knowledge graph of the mainframe application; and optimizing the mainframe application based on the aggregated results of the field level data flow analysis for each particular data flow path in the plurality of data flow paths in the set of control flow chains corresponding to each respective program of the plurality of programs called by the particular job step of the plurality of job steps in each respective job of the plurality of jobs in the sequence of job execution corresponding to the mainframe application comprised of the plurality of programs.

2. The method of claim 1, further comprising:

outputting the aggregated results of the field level data flow analysis for each particular data flow path in the plurality of data flow paths in the set of control flow chains corresponding to each respective program of the plurality of programs called by the particular job step of the plurality of job steps in each respective job of the plurality of jobs in the sequence of job execution corresponding to the mainframe application comprised of the plurality of programs to a user via a client device.

3. The method of claim 1, further comprising:

retrieving source code of the mainframe application that includes job control language code corresponding to the plurality of jobs.

4. The method of claim 3, further comprising:

generating the application knowledge graph of the mainframe application based on entities corresponding to the mainframe application, relationships between the entities, and record layout of each respective dataset of the plurality of datasets corresponding to the mainframe application, wherein;

the entities corresponding to the mainframe application and the relationships between the entities are based on a static code analysis of the source code of the mainframe application, the entities including the plurality of programs, the plurality of jobs, and the plurality of datasets corresponding to the mainframe application, and the record layout of each respective dataset of the plurality of datasets corresponding to the mainframe application includes a sequence of the plurality of fields in a corresponding record of a particular dataset.

5. The method of claim 1, wherein the sequence of job execution of the plurality of jobs corresponding to the mainframe application is based on information contained in the application knowledge graph of the mainframe application in response to the job scheduler level data flow analysis across the plurality of jobs.

6. The method of claim 1, wherein:

the job level data flow analysis for each respective job of the plurality of jobs corresponding to the mainframe application in the sequence of job execution is based on the sequence of job execution of the plurality of jobs, and the set of control flow chains and the plurality of data flow paths in the set of control flow chains correspond to each respective job of the plurality of jobs in the sequence of job execution.

7. The method of claim 1, further comprising:

aggregating the results of the field level data flow analysis of each respective data flow path for each particular online transaction of a plurality of online transactions corresponding to the mainframe application to form aggregated results of the field level data flow analysis of the plurality of online transactions, wherein:

the set of control flow chains and the plurality of data flow paths in the set of control flow chains correspond to each respective online transaction of the plurality of online transactions in response to receiving an input to perform the field level data flow analysis of the plurality of online transactions from a user via a client device, and each particular field of the plurality of fields in the record of each dataset of the plurality of datasets or each particular field of a plurality of fields in a database table that is included in a respective data flow path of the plurality of data flow paths forms the field level data flow analysis of each respective data flow path for each particular online transaction of the plurality of online transactions; and outputting the aggregated results of the field level data flow analysis of the plurality of online transactions to the user via the client device.

8. A computer system comprising:

a communication fabric;

a storage device connected to the communication fabric, wherein the storage device stores program instructions; and a processor connected to the communication fabric, wherein the processor executes the program instructions to:

receive an input to perform a field level data flow analysis of a mainframe application, wherein the field level data flow analysis includes a program level data flow analysis across lines of program code corresponding to the mainframe application, a job level data flow analysis across a plurality of programs corresponding to the mainframe application, and a job scheduler level data flow analysis across a plurality of jobs corresponding to the mainframe application;

aggregate results of the field level data flow analysis for each particular data flow path in a plurality of data flow paths in a set of control flow chains corresponding to each respective program of the plurality of programs called by a particular job step of a plurality of job steps in each respective job of the plurality of jobs in a sequence of job execution corresponding to the mainframe application comprised of the plurality of programs to form aggregated results of the field level data flow analysis, wherein:

the program level data flow analysis is based on each respective data flow path of the plurality of data flow paths corresponding to each respective program of the plurality of programs called by the particular job step of the plurality of job steps in each respective job of the plurality of jobs in the sequence of job execution corresponding to the mainframe application comprised of the plurality of programs, and wherein each particular field of a plurality of fields is identified in a record of each dataset of a plurality of datasets corresponds to the mainframe application that is included in a particular data flow path of the plurality of data flow paths forming the field level data flow analysis, the field level data flow analysis is based on all possible data flow paths between a combination of different database types and certain fields of records in the plurality of datasets used by the plurality of programs of the mainframe application at a program level, a job level, and a job scheduling level for each particular data flow path in response to the program level data flow analysis, a respective verification of each particular data flow path of the plurality of data flow paths is based on data flow between the certain fields of the records in the plurality of datasets used by the plurality of programs of the mainframe application to establish field level dependency between each respective pair of datasets in the plurality of datasets, and a unique layout of the records among a plurality of layouts influences a particular data flow path and byte positions of data in the unique layout, the plurality of layouts being based on a program variable flattening operation and an application knowledge graph of the mainframe application; and optimize the mainframe application based on the aggregated results of the field level data flow analysis for each particular data flow path in the plurality of data flow paths in the set of control flow chains corresponding to each respective program of the plurality of programs called by the particular job step of the plurality of job steps in each respective job of the plurality of jobs in the sequence of job execution corresponding to the mainframe application comprised of the plurality of programs.

9. The computer system of claim 8, wherein the processor further executes the program instructions to:

output the aggregated results of the field level data flow analysis for each particular data flow path in the plurality of data flow paths in the set of control flow chains corresponding to each respective program of the plurality of programs called by the particular job step of the plurality of job steps in each respective job of the plurality of jobs in the sequence of job execution corresponding to the mainframe application comprised of the plurality of programs to a user via a client device.

10. The computer system of claim 8, wherein the processor further executes the program instructions to:

retrieve source code of the mainframe application that includes job control language code corresponding to the plurality of jobs.

11. A computer program product product comprising a computer-readable storage medium having program instructions embodied therewith, the program instructions executable by a computer to cause the computer to:

receive an input to perform a field level data flow analysis of a mainframe application, wherein the field level data flow analysis includes a program level data flow analysis across lines of program code corresponding to the mainframe application, a job level data flow analysis across a plurality of programs corresponding to the mainframe application, and a job scheduler level data flow analysis across a plurality of jobs corresponding to the mainframe application;

aggregate results of the field level data flow analysis for each particular data flow path in a plurality of data flow paths in a set of control flow chains corresponding to each respective program of the plurality of programs called by a particular job step of a plurality of job steps in each respective job of the plurality of jobs in a sequence of job execution corresponding to the mainframe application comprised of the plurality of programs to form aggregated results of the field level data flow analysis, wherein;

the program level data flow analysis is based on each respective data flow path of the plurality of data flow paths corresponding to each respective program of the plurality of programs called by the particular job step of the plurality of job steps in each respective job of the plurality of jobs in the sequence of job execution corresponding to the mainframe application comprised of the plurality of programs, each particular field of a plurality of fields is identified in a record of each dataset of a plurality of datasets corresponds to the mainframe application that is included in a particular data flow path of the plurality of data flow paths forming the field level data flow analysis, the field level data flow analysis is based on all possible data flow paths between a combination of different database types and certain fields of records in the plurality of datasets used by the plurality of programs of the mainframe application at a program level, a job level, and a job scheduling level for each particular data flow path in response to the program level data flow analysis, a respective verification of each particular data flow path of the plurality of data flow paths is based on data flow between the certain fields of the records in the plurality of datasets used by the plurality of programs of the mainframe application to establish field level dependency between each respective pair of datasets in the plurality of datasets, and a unique layout of the records among a plurality of layouts influences a particular data flow path and byte positions of data in the unique layout, the plurality of layouts being based on a program variable flattening operation and an application knowledge graph of the mainframe application; and optimize the mainframe application based on the aggregated results of the field level data flow analysis for each particular data flow path in the plurality of data flow paths in the set of control flow chains corresponding to each respective program of the plurality of programs called by the particular job step of the plurality of job steps in each respective job of the plurality of jobs in the sequence of job execution corresponding to the mainframe application comprised of the plurality of programs.

12. The computer program product of claim 11, wherein the program instructions further cause the computer to:

output the aggregated results of the field level data flow analysis for each particular data flow path in the plurality of data flow paths in the set of control flow chains corresponding to each respective program of the plurality of programs called by the particular job step of the plurality of job steps in each respective job of the plurality of jobs in the sequence of job execution corresponding to the mainframe application comprised of the plurality of programs to a user via a client device.

13. The computer program product of claim 11, wherein the program instructions further cause the computer to:

retrieve source code of the mainframe application that includes job control language code corresponding to the plurality of jobs.

14. The computer program product of claim 13, wherein the program instructions further cause the computer to:

generate the application knowledge graph of the mainframe application based on entities corresponding to the mainframe application, relationships between the entities, and record layout of each respective dataset of the plurality of datasets corresponding to the mainframe application, wherein:

the entities corresponding to the mainframe application and the relationships between the entities are based on a static code analysis of the source code of the mainframe application, the entities including the plurality of programs, the plurality of jobs, and the plurality of datasets corresponding to the mainframe application, and the record layout of each respective dataset of the plurality of datasets corresponding to the mainframe application includes a sequence of the plurality of fields in a corresponding record of a particular dataset.

15. The computer program product of claim 11, wherein the job scheduler level data flow analysis is performed across the plurality of jobs, and wherein the sequence of job execution of the plurality of jobs corresponding to the mainframe application is based on information contained in the application knowledge graph of the mainframe application in response to the job scheduler level data flow analysis across the plurality of jobs.

16. The computer program product of claim 11, wherein:

job level data flow analysis for each respective job of the plurality of jobs corresponding to the mainframe application in the sequence of job execution is based on the sequence of job execution of the plurality of jobs, and the set of control flow chains and the plurality of data flow paths in the set of control flow chains correspond to each respective job of the plurality of jobs in the sequence of job execution.

* * * * *